US012764266B2

(12) United States Patent
Kitayama et al.

(10) Patent No.: US 12,764,266 B2
(45) Date of Patent: Oct. 13, 2026

(54) ELECTRONIC DEVICE AND CONTROL METHOD OF ELECTRONIC DEVICE THAT CONVERT A FIRST VIDEO IN A FIRST DISPLAY MODE TO A SECOND VIDEO IN A SECOND DISPLAY MODE

(71) Applicant: CANON KABUSHIKI KAISHA, Tokyo (JP)

(72) Inventors: Toma Kitayama, Tokyo (JP); Toru Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/004,601

(22) Filed: Dec. 30, 2024

(65) Prior Publication Data

US 2025/0240399 A1 Jul. 24, 2025

(30) Foreign Application Priority Data

Jan. 23, 2024 (JP) ................................ 2024-007917
Jun. 7, 2024 (JP) ................................ 2024-092912

(51) Int. Cl.
*H04N 23/68* (2023.01)
*G11B 27/031* (2006.01)
*H04N 13/144* (2018.01)

(52) U.S. Cl.
CPC ......... *H04N 13/144* (2018.05); *G11B 27/031* (2013.01); *H04N 23/683* (2023.01)

(58) Field of Classification Search
USPC ........................................................ 386/278
See application file for complete search history.

(56) References Cited

U.S. PATENT DOCUMENTS 10,223,775 B2 * 3/2019 Swami .................. H04N 23/90
11,682,105 B2 * 6/2023 Duan ........................ G06T 3/40
345/667

(Continued)

FOREIGN PATENT DOCUMENTS

JP 2006295626 A 10/2006
JP 2011247966 A 12/2011

(Continued)

OTHER PUBLICATIONS

Japanese Office Action issued Mar. 3, 2026, in corresponding Japanese Application No. 2024-092912.

*Primary Examiner* — Nigar Chowdhury
(74) *Attorney, Agent, or Firm* — Venable LLP

(57) ABSTRACT

An electronic device converts a first video in a first display mode including a- shooting region representing a result of shooting by an image capturing apparatus to a second-video, which is a video in a second display mode including a plurality of frames. The- electronic device acquires the first video. The electronic device sets invalid regions of the same shape to the same positions in the plurality of frames of the second video. The- electronic device converts the first video so as to set a pixel value representing invalidity to- each of the invalid regions in the plurality of individual frames of the second video and- thereby generates the second video.
An electronic device converts a first video in a first display mode including a shooting region representing a result of shooting by an image capturing apparatus to a second video, which is a video in a second display mode including a plurality of frames, the electronic device including processors and/or circuity to acquire the first video and meta data related to a shooting state of the first video, to perform information generation processing of generating, on a basis of the meta data, correction information related to geometrical correction to be performed during generation of the (Continued)

second video, to perform mask generation processing of generating a mask image covering a local region of the second video, and to perform generation processing of generating the second video, to which the mask image is applied to each of the frames, through conversion of the first video on a basis of the correction information.

14 Claims, 27 Drawing Sheets

(56) References Cited

U.S. PATENT DOCUMENTS

| | | | | |
|---|---|---|---|---|
| 12,212,732 | B2 | 1/2025 | Kobayashi et al. | |
| 12,266,167 | B1 * | 4/2025 | Agram | G06V 20/13 |
| 12,287,077 | B2 * | 4/2025 | Fioravanti | B60Q 1/503 |
| 2008/0266321 | A1 * | 10/2008 | Aufranc | H04N 9/3179<br>353/30 |
| 2012/0293608 | A1 * | 11/2012 | Doepke | H04N 23/698<br>348/36 |
| 2014/0232695 | A1 * | 8/2014 | McGaughan | G06F 3/0426<br>345/175 |
| 2014/0241568 | A1 * | 8/2014 | Yamada | G06T 1/0021<br>382/100 |
| 2014/0340513 | A1 | 11/2014 | Nagata et al. | |
| 2016/0343152 | A1 * | 11/2016 | Hay | G06T 7/337 |
| 2018/0075587 | A1 * | 3/2018 | Swami | H04N 5/265 |
| 2018/0302544 | A1 * | 10/2018 | Dhiman | H04N 23/71 |
| 2020/0151427 | A1 * | 5/2020 | Kimura | G06V 40/18 |
| 2020/0280684 | A1 * | 9/2020 | Xu | B60R 1/27 |
| 2021/0127046 | A1 * | 4/2021 | Kamm | G01J 3/0248 |
| 2022/0020129 | A1 * | 1/2022 | Makino | G06V 10/431 |
| 2023/0055204 | A1 * | 2/2023 | Ungureanu | G06T 11/00 |
| 2024/0135667 | A1 * | 4/2024 | Bhanushali | G06V 10/273 |
| 2024/0365006 | A1 | 10/2024 | Kobayashi | |

FOREIGN PATENT DOCUMENTS

| | | | |
|---|---|---|---|
| JP | 2013157810 | A | 8/2013 |
| JP | 2019128628 | A | 8/2019 |
| JP | 2020108111 | A | 7/2020 |
| JP | 2022184139 | A | 12/2022 |
| JP | 2022191013 | A | 12/2022 |
| JP | 2023079119 | A | 6/2023 |

* cited by examiner

ELECTRONIC DEVICE AND CONTROL METHOD OF ELECTRONIC DEVICE THAT CONVERT A FIRST VIDEO IN A FIRST DISPLAY MODE TO A SECOND VIDEO IN A SECOND DISPLAY MODE

CROSS-REFERENCE TO PRIORITY APPLICATION

This application claims the benefit of Japanese Patent Application No. 2024-007917, filed on Jan. 23, 2024, and Japanese Patent Application No. 2024-092912, filed on Jun. 7, 2024, each of which is hereby incorporated by reference herein in its entirety.

BACKGROUND OF THE DISCLOSURE

Field of the Disclosure

The present invention relates to an electronic device and a control method of the electronic device.

Description of the Related Art

In general, a virtual reality (VR) image (VR video) includes two images (a left-eye image and a right-eye image) that can be viewed stereoscopically by a user by using a parallax when the VR image (VR video) is reproduced on a head-mounted display (HMD). For example, the VR image includes two equirectangular projection images resulting from equirectangular conversion performed on circular fisheye images captured through two circular fisheye lenses.

When mounting of the two circular fisheye lenses is not appropriate, a parallax between the two circular fisheye images may not be appropriate for stereoscopy. In this case, by adjusting parameters to be used for the equirectangular conversion by which the circular fisheye images are converted to the equirectangular projection images, it is possible to achieve conversion to the equirectangular projection images such that the parallax is appropriate for stereoscopy.

However, there may be a case when, as a result of the parameter adjustment, each of the circular fisheye images has no valid region corresponding to a local region of the equirectangular projection image, and the local region of the equirectangular projection image is set to an invalid region having invalid pixel values.

Japanese Patent Application Publication No. 2022-184139 discloses a technology that provides, during equirectangular conversion of a VR image, an invalid region of each of left and right images with the same shape.

There is a method in which, in a case of generating a video file of VR images, parameters to be used for equirectangular conversion are adjusted so as to correct a motion blur between a frame of concern and a frame previous or subsequent thereto and thereby carry out camera shake correction. As described above, depending on values of the parameters to be used for the equirectangular conversion, a region of the equirectangular projection image resulting from the conversion may locally have an invalid region. When the parameters to be used for the equirectangular conversion differ from one frame to another, it may be possible that, by performing the camera shake correction, the invalid region of the equirectangular projection image moves during video reproduction.

As a result, when the camera shake correction is performed, flickering is observed in the equirectangular projection image. However, the technology described in Japanese Patent Application Publication No. 2022-184139 cannot suppress the flickering.

SUMMARY OF THE DISCLOSURE

It is, therefore, an object of the present invention to be able to generate a VR video with reduced flickering during reproduction.

An aspect of the disclosure is an electronic device that converts a first video in a first display mode including a shooting region representing a result of shooting by an image capturing apparatus to a second video, which is a video in a second display mode including a plurality of frames, the electronic device including one or more processors and/or circuitry configured to perform acquisition processing of acquiring the first video, to perform setting processing of setting invalid regions of the same shape to the same positions in the plurality of frames of the second video, and to perform generation processing of converting the first video so as to set a pixel value representing invalidity to each of the invalid regions in the plurality of individual frames of the second video and thereby generating the second video.

An aspect of the disclosure is a control method of an electronic device that converts a first video in a first display mode including a shooting region representing a result of shooting by an image capturing apparatus to a second video, which is a video in a second display mode including a plurality of frames, the control method including an acquisition step of acquiring the first video and meta data related to a shooting state of the first video, an information generation step of generating, on a basis of the meta data, correction information related to geometrical correction to be performed during generation of the second video, a mask generation step of generating a mask image covering a local region of the second video, the mask image being applied to each of the frames, and a generation step of generating, on the basis of the correction information, the second video through conversion of a first video.

Further features of the present disclosure will become apparent from the following description of exemplary embodiments with reference to the attached drawings.

DESCRIPTION OF THE EMBODIMENTS

Referring to the accompanying drawings, the following will describe embodiments of the present invention in detail.

Figure 1:
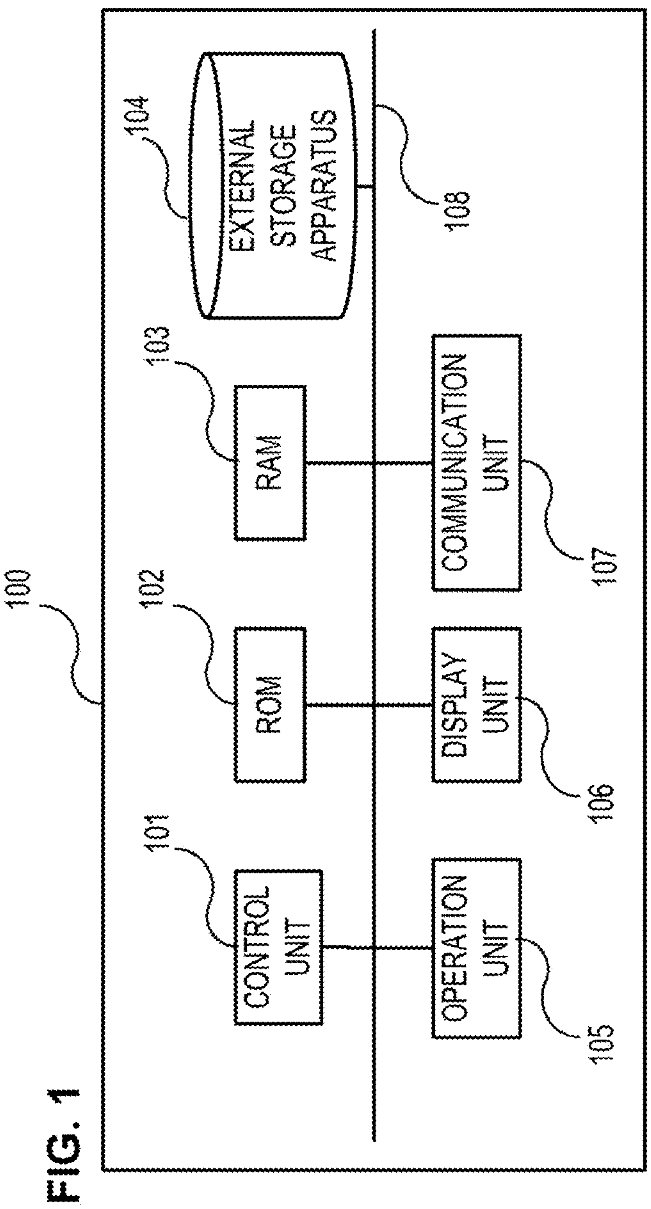
FIG. 1 is a configuration diagram of an editing apparatus according to an embodiment.

FIG. 1 illustrates an example of a configuration of an editing apparatus 100 that is an image display apparatus (video editing apparatus) common to all the embodiments. For example, the editing apparatus 100 is an electronic device such as a computer, a smartphone, or an image capturing apparatus (such as a digital camera).

The editing apparatus 100 includes a control unit 101, a ROM 102, a RAM 103, an external storage apparatus 104, an operation unit 105, a display unit 106, a communication unit 107, and a system bus 108.

The control unit 101 controls the entire editing apparatus 100. For example, the control unit 101 is a Central Processing Unit (CPU). The control unit 101 can also perform image generation, setting processing, and calculation processing. Accordingly, the control unit 101 can also operate below as a "generation unit", a "setting unit", and a "coordinate calculation unit".

The ROM 102 is a Read Only Memory (ROM) that stores information (programs and parameters) that need not be changed.

The RAM 103 is a Random Access Memory (RAM) that temporarily stores information (programs and data) supplied from an external apparatus or the like.

The external storage apparatus 104 is disposed by being fixed to the editing apparatus 100. The external storage apparatus 104 is a hard disk or a flash memory. Alternatively, the external storage apparatus 104 includes an optical disk detachable from the editing apparatus 100, such as a floppy disk (FD) or a Compact Disk (CD). The external storage apparatus 104 may also have a magnetic card, an optical card, an IC card, a memory card, or the like.

The operation unit 105 receives an instruction according to an operation of a user. The operation unit 105 includes an operation member (a button or a touch panel) operable by the user.

The display unit 106 displays data held by the editing apparatus 100 and data supplied to the editing apparatus 100.

The communication unit 107 communicates with an external apparatus such as a camera (image capturing apparatus such as a digital camera).

The system bus 108 provides communicable connection between the individual components (units).

A video file including image data, meta data, and the like, is stored (recorded) in the external storage apparatus 104. The video file can also be read from the external storage apparatus 104. The communication unit 107 can also receive the video file from an external apparatus such as a camera. Therefore, in the following, the "input unit" or the "acquisition unit" for data is a general name of the external storage apparatus 104 and the communication unit 107.

Figure 2:
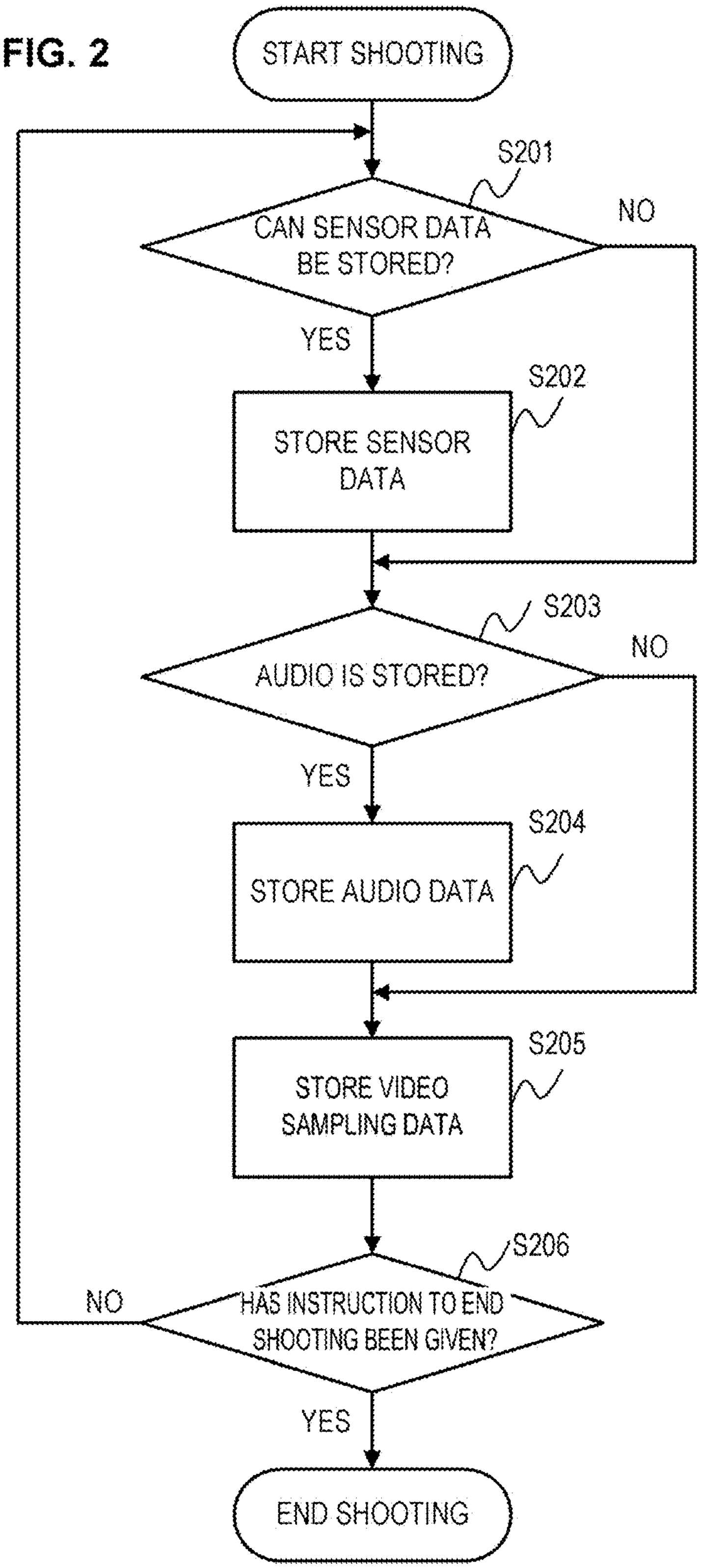
FIG. 2 is a flow chart of an operation of a camera according to the embodiment.

Referring to the flow chart of FIG. 2, an operation of the camera (image capturing apparatus) that can communicate with the editing apparatus 100 during shooting will be described.

In Step S201, the camera determines whether or not sensor data during the shooting can be stored (recorded) in the video file. The sensor data mentioned herein is inertia data representing, e.g., an acceleration measured by a gyro sensor or the like. The camera periodically stores the inertial data from the gyro sensor in the video file to be able to record movement of the camera during the shooting. When it is determined that the sensor data can be stored, a flow advances to Step S202. When it is determined that the sensor data cannot be stored, the flow advances to Step S203.

In Step S202, the camera stores the sensor data as timed meta data (meta data having information in time series) in the video file.

In Step S203, the camera determines whether or not audio (sound and voice) is to be stored in the video file. Depending on a shooting mode, the control unit 101 may not store the audio in the video file. When it is determined that the audio is to be stored, the flow advances to Step S204. When it is determined that the audio is not to be stored, the flow advances to Step S205.

In Step S204, the camera stores the audio data (sound/voice data) as audio sampling data in the video file.

In Step S205, the camera stores an image in one frame as video sampling data in the video file.

In Step S206, the camera determines whether or not an instruction to end the shooting has been given. When it is determined that the instruction to end the shooting has been given, processing in the present flow chart is ended. When it is determined that the instruction to end the shooting has not been given, the processing in the present flow chart returns to Step S201.

Figure 3:
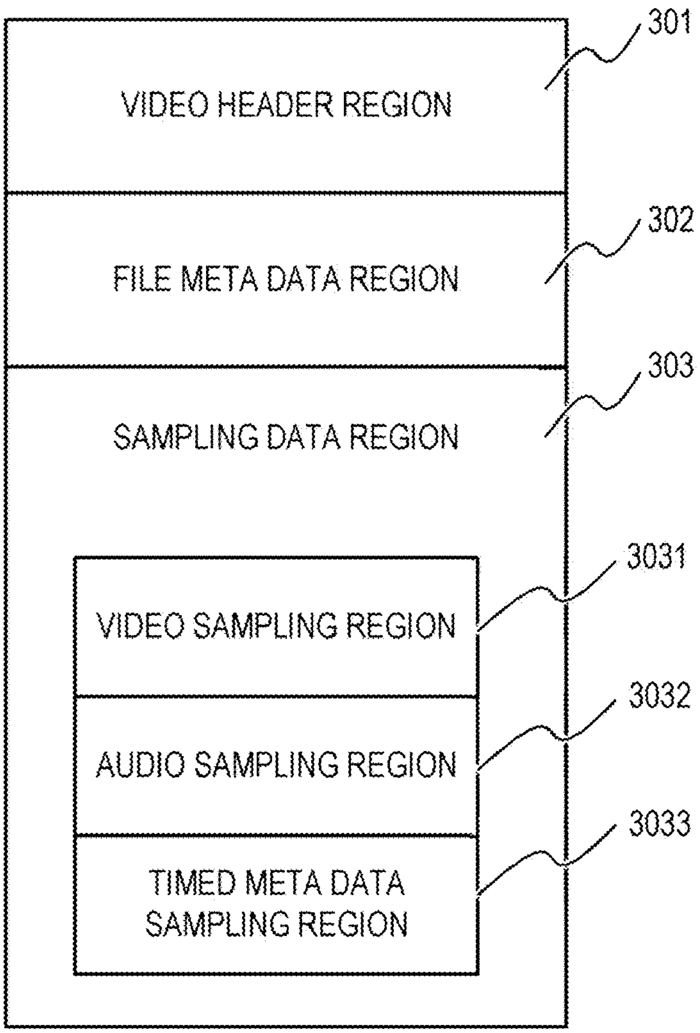
FIG. 3 is a diagram illustrating a structure of a video file according to the embodiment.

FIG. 3 illustrates a structure of the video file acquired by the camera. The video file includes a video header region 301, a file meta data region 302, and a sampling data region 303.

The video header region 301 holds information related to the entire video (hereafter referred to as "video-related information"). For example, the video-related information includes at least any of information items such as an image size (a width and a height) of a moving image, a frame rate, an audio sample frequency, a sample size, and the number of channels. The video-related information may also include information items such as a position (a reproduction position or a reproduction time) of a sample (which is data in one frame in a case of the video) of each medium (such as the video, the audio, or the timed meta data) and a size thereof.

The file meta data region 302 holds meta data related to a file and the entire video. For example, in the file meta data region 302, information related to a lens during the shooting, a design value (such as a center portion or radius of an image circle), a measurement value resulting from measurement based on calibration, and the like, are stored as the meta data.

The sampling data region 303 stores sampling data of each medium. The sampling data region 303 includes a video sampling region 3031, an audio sampling region 3032, and a timed meta data sampling region 3033.

The video sampling region 3031 stores the sampling data of the video medium. The sampling data of the video medium is image data stored in Step S205 in FIG. 2. For example, when a VR video is acquired as a result of shooting by a camera with two fisheye lenses mounted therein, in the video sampling region 3031, two circular fisheye images are stored as a video sample in one frame.

The audio sampling region 3032 stores the sampling data of the audio medium. The sampling data of the audio medium is audio data stored in S204 in FIG. 2. When it is unnecessary to record the audio data, the audio sampling region 3032 need not be present.

The timed meta data sampling region 3033 stores the sampling data of the timed meta data medium. For example, the sampling data of the timed meta data medium is the sensor data stored in Step S202 in FIG. 2. When it is unnecessary to record the timed meta data, the timed meta data sampling region 3033 need not be present.

Figure 4C:
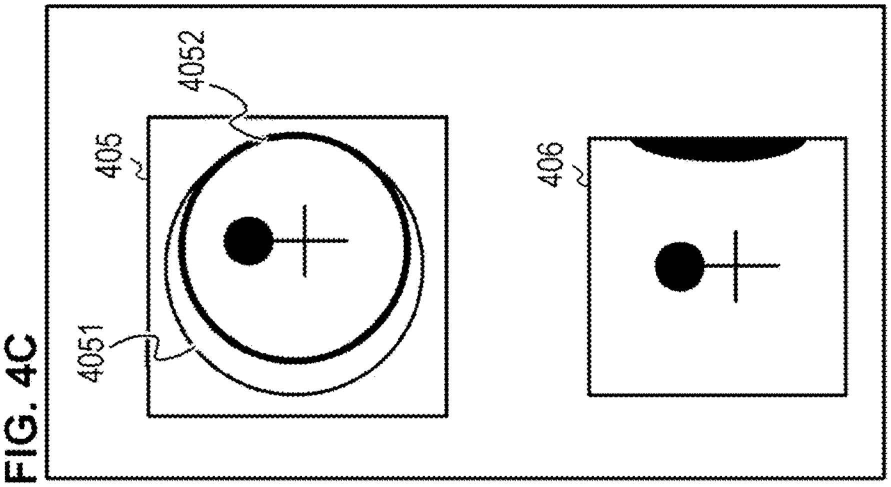
FIGS. 4A to 4C are diagrams illustrating circular fisheye images and equirectangular images according to the embodiment.
Figure 4B:
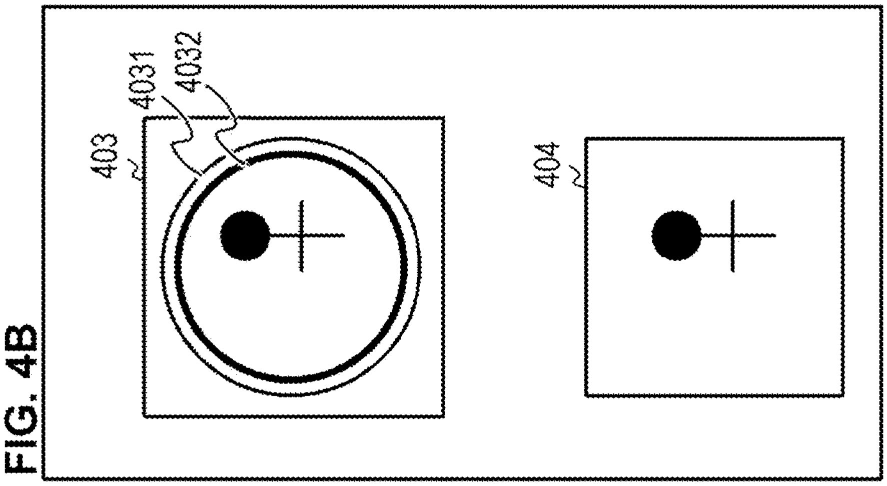
Figure 4A:
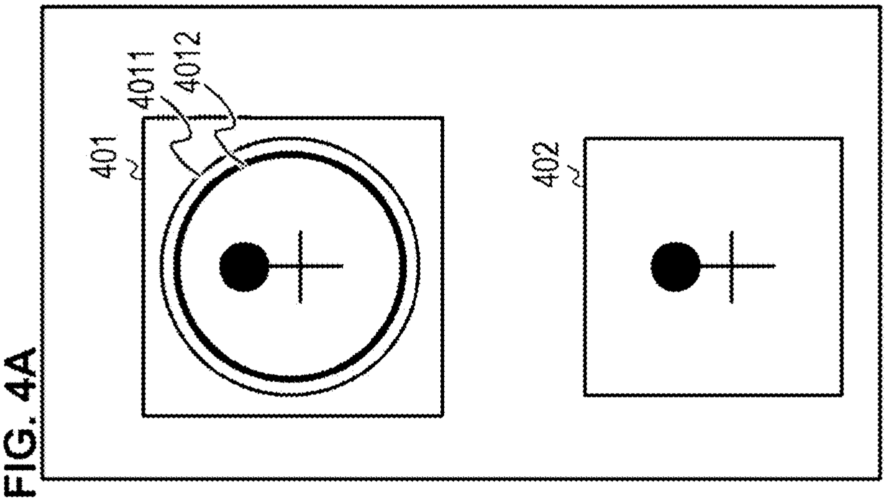

FIGS. 4A to 4C illustrate circular fisheye images recorded by the camera and equirectangular projection images (hereafter referred to as the "equirectangular images") resulting from conversion of the circular fisheye images by the editing apparatus 100. Referring to FIGS. 4A and 4B, a description will be given below of the equirectangular images and, referring to FIG. 4C, a description will be given of the equirectangular image after being subjected to camera shake correction according to each of the embodiments described later. Note that, for ease of explanation, a description will be given of one circular fisheye image recorded by a camera with one fisheye lens mounted therein and one equirectangular image generated from the circular fisheye image. However, the same features as described below are observed even in the two circular fisheye images recorded by the camera with the two fisheye lenses mounted therein and the two equirectangular images generated from the two circular fisheye images.

FIG. 4A

A circular fisheye image 401 is an example of one circular fisheye image recorded by the camera with the fisheye lens mounted therein.

An image circle 4011 is a region (shooting region) where an object to be imaged is captured by the camera via the fisheye lens. Inside of the image circle 4011, the imaged object is recorded. The outside of the image circle 4011 is an invalid region where no image is observed, and black or a color close to black is recorded. The invalid region is a region irrelevant to a result of the shooting. Positional information (information such as a center position and a radius) of the image circle 4011 in the circular fisheye image is stored as file meta data in the file meta data region 302. Normally, the position of the image circle 4011 is constant since a position of the lens does not vary during the shooting.

A region 4012 is a region to be subjected to equirectangular conversion. The inside of the region 4012 is developed in the equirectangular image. Information representing a size of the region 4012 is also stored as the file meta data in the file meta data region 302. The position of the region 4012 has the same center as the center of the image circle 4011 in default, but can also be changed.

An equirectangular image 402 is an equirectangular image resulting from the equirectangular conversion of the region 4012 included in the image circle 4011.

FIG. 4B

A circular fisheye image 403 is an example of the circular fisheye image recorded by the camera, similarly to the circular fisheye image 401.

An image circle 4031 is an image circle, similarly to the image circle 4011. A region 4032 is a region to be subjected to the equirectangular conversion, similarly to the region 4012.

In the circular fisheye image 403, the camera is oriented slightly more leftward than in the circular fisheye image 401, and, accordingly, the imaged object is observed at a position slightly shifted to a right side from a center inside of the image circle 4031.

The equirectangular image 404 is obtained as a result of performing the equirectangular conversion on the region 4032 included in the circular fisheye image 403. In the circular fisheye image 403, a position of the region 4032 with respect to the image circle 4031 is the same as a position of the region 4012 with respect to the image circle 4011 in the circular fisheye image 401. Accordingly, in the equirectangular image 404, the imaged object is placed at a position slightly shifted to the right side from the center of the image.

FIG. 4C

A circular fisheye image 405 is an example of the circular fisheye image recorded by the camera, similarly to each of the circular fisheye image 401 and the circular fisheye image 403.

An image circle 4051 is an image circle, similarly to each of the image circle 4011 and the image circle 4031.

A region 4052 is a region to be subjected to the equirectangular conversion, similarly to each of the region 4012 and the region 4032. A position of the region 4052 is slightly shifted to the right side compared to the positions of the region 4012 and the region 4032.

An equirectangular image 406 is an equirectangular image obtained as a result of the equirectangular conversion of the region 4052 included in the circular fisheye image 405. A position of the region 4052 is located closer to the right side of the image circle 4051, and therefore the imaged object is located at the center in the equirectangular image. Thus, in each of the following embodiments, when the equirectangular image is to be generated from the circular fisheye image, a region of the circular fisheye image to be subjected to the equirectangular conversion is changed. As a result, it is possible to obtain an effect of reducing an effect of camera shake in the equirectangular image.

Meanwhile, the right side of the region 4052 locally spreads out from the outside (which equals to the invalid region) of the image circle 4051, and, accordingly, a local region of the right side of the equirectangular image 406 obtained as a result of the equirectangular conversion refers to the invalid region of the circular fisheye image 405. In the invalid region, there is no valid pixel value of the circular fisheye image 405, and, therefore, a pixel (e.g., black-color pixel) having a pixel value representing the invalid region is present in the equirectangular image 406.

First Embodiment

Figure 5:
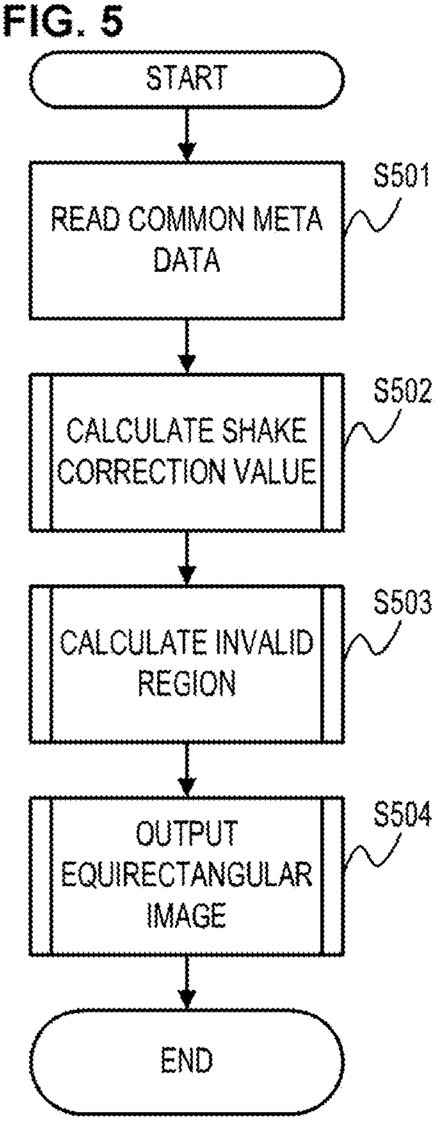
FIG. 5 is a flow chart of processing of generating a VR video according to a first embodiment.

Referring to a flow chart of FIG. 5, a description will be given of processing of generating a VR video (VR180 video), which is an equirectangular image. In the first embodiment, the VR video is generated from a video, which is a circular fisheye image in a display mode different from that of the equirectangular image. Note that the first embodiment is not limited to a case when the equirectangular image is to be generated from the circular fisheye image, and the first embodiment is applicable to a case when, from an image in a given display mode, an image in a display mode different from the display mode is to be generated.

In Step S501, the control unit 101 reads, through the input unit, common meta data (meta data common to all the frames) stored in the file meta data region 302 of the video file therefrom. For example, the common meta data includes information items such as the center position of the image circle, the radius of the image circle, and a radius of a region to be subjected to the equirectangular conversion. The control unit 101 also reads, as the meta data, parameter values (manual correction parameter values) set by the user by using the operation unit 105. These meta data items are used when the equirectangular image is to be generated from the circular fisheye image in the subsequent step.

In Step S502, the control unit 101 calculates the shake correction value for each of all the frames. Processing in Step S502 will be described in detail with reference to the flow chart of FIG. 6. The shake correction value is a value for correcting displacement of a position in the equirectangular image resulting from camera shake (camera wobbling).

In Step S503, the control unit 101 calculates the invalid region of the equirectangular image in each of all the frames. Processing in Step S503 will be described in detail with reference to the flow chart of FIG. 7.

In Step S504, the control unit 101 generates the equirectangular image in each of all the frames, and outputs the generated equirectangular image. Processing in Step S504 will be described in detail with reference to the flow chart of FIG. 8.

Processing in Step S502

Referring to the flow chart of FIG. 6, a description will be given of processing of calculating the shake correction value. Hereinbelow, the control unit 101 calculates the shake correction value for each of the frames. Note that, when the equirectangular image is to be generated from the circular fisheye image, by using the shake correction value, it is possible to correct the effect of shake (camera shake or wobbling of the camera) in the equirectangular image on a per frame basis.

In Step S601, the control unit 101 sets, to zero , each of a variable i representing a frame number of the read image data and a variable n representing a frame number of the image data for which the shake correction value is to be calculated.

In Step S602, the control unit 101 determines whether or not the image data (image data of the circular fisheye image) in each of all the frames stored in the video file has been read. When it is determined that the image data in each of all the frames has been read, a flow advances to Step S612. When it is determined that the image data in at least one of the frames has not been read, the flow advances to Step S603.

In Step S603, the control unit 101 reads the image data of the circular fisheye image in the frame having a frame number i (which equals to the frame i) from the video sampling region 3031 of the video file. When the image data stored in the video sampling region 3031 is compressed herein, the control unit 101 decodes the image data to acquire the image data in a RGB format.

In Step S604, the control unit 101 analyzes the read image data (performs image processing on the image data) to extract feature points in the circular fisheye image.

In Step S605, the control unit 101 determines whether or not the sensor data in the frame i is stored in the timed meta data sampling region 3033 of the video file. When it is determined that the sensor data in the frame i is stored, the flow advances to Step S606. When it is determined that the sensor data in the frame i is not stored, the flow advances to Step S607.

In Step S606, the control unit 101 reads, from the timed meta data sampling region 3033, the sensor data in the frame i (sensor data related to motion of the camera during shooting of the circular fisheye image in the frame i).

In Step S607, the control unit 101 adds 1 to the variable i representing the read frame number.

In Step S608, the control unit 101 determines whether or not the image data in the number of frames required to calculate a shake amount in the frame of the frame number n (which equals to the frame n) has been read. For example, the shake amount is an "amount of camera movement or amount of movement of the object to be imaged in the image data" due to cameral shake during a specific period around a time of one frame. Consequently, to calculate, e.g., the shake amount in one frame, the image data in each of one-second frames previous and subsequent to the one frame is required. When it is determined that the image data in the required number of frames has been read, the flow advances to Step S609. When it is determined that the image data in the required number of frames has not been read, the flow returns to Step S602.

In Step S609, the control unit 101 calculates the shake amount in the frame n. For example, the control unit 101 calculates the shake amount in the frame n on the basis of "information on the feature points and the sensor data" in each of the frame n and the frames previous and subsequent thereto. At this time, the control unit 101 may also calculate the shake amount on the basis of only the information on the feature points or on the basis of only the sensor data.

The motion of the camera due to camera shake unintended by the user is different from movement of the camera as camerawork. For example, in the event of camera shake, the camera performs lateral or vertical reciprocal movement at short periods. Accordingly, the control unit 101 can calculate the shake amount on the basis of a movement pattern of the feature points between the plurality of frames or a value of a gyro sensor mounted in the camera.

In Step S610, the control unit 101 calculates a shake correction value for correcting shake in the shake amount on the basis of the shake amount in the frame n calculated in Step S609.

In Step S611, the control unit 101 adds 1 to the variable n.

As described above, to calculate the shake correction amount in one frame, information on the frames previous and subsequent thereto is also required. Accordingly, at a time when all the frames are read, the shake correction value for each of all the frames has not been calculated yet, and the plurality of frames for which the shake correction values are uncalculated remain. Consequently, in Step S612 and thereafter, the shake correction values for these remaining fames are calculated.

In Step S612, the control unit 101 determines whether or not the shake correction value for each of all the frames has been calculated. When it is determined that the shake correction value for each of all the frames has been calculated, the processing in the present flow chart is ended. When it is determined that the shake correction value for each of all the frames has not been calculated yet, the flow advances to Step S613.

In Step S613, the control unit 101 calculates the shake amount in the frame n. Processing in Step S613 is the same processing as the processing in Step S609.

In Step S614, the control unit 101 calculates, on the basis of the shake amount in the frame n calculated in Step S613, the shake correction value for correcting the shake in the shake amount. Processing in Step S614 is the same processing as the processing in Step S610.

In Step S615, the control unit 101 adds 1 to the variable n.

Processing in Step S503

Referring to a flow chart of FIG. 7, a description will be given of processing of calculating the invalid region (invalid region common to all the frames) in the equirectangular image.

In Step S701, the control unit 101 sets the variable i representing the frame number to zero.

In Step S702, the control unit 101 determines whether or not calculation of the invalid pixels in the equirectangular image in each of all the frames has been ended. The invalid pixels mentioned herein are pixels to which invalid pixel values (specific pixel values) are to be set in the subsequent step. When it is determined that the calculation of the invalid pixels in the equirectangular image in each of all the frames has been ended, the processing in the present flow chart is ended. When it is determined that the calculation of at least any of the invalid pixels in the equirectangular image in each of all the frames has not been ended, a flow advances to Step S703.

In Step S703, the control unit 101 acquires the shake correction value for the frame i. The shake correction value is used to correct a position of a region to be subjected to the equirectangular conversion in the circular fisheye image 405 illustrated in FIG. 4C.

In Step S704, the control unit 101 sets coordinates (x, y) of a pixel to be subjected to processing in the equirectangular image in the frame i to (0, 0). The control unit 101 processes both one-eye images (both of a left-eye image and a right-eye image) in the equirectangular image in one loop (Steps S705 to S710). In each of the one-eye images in a VR image, a width and a height are equal to each other. Accordingly, when it is assumed that a width of each of the one-eye images is j pixels and a height of the one-eye image is j rows, coordinates of the one-eye image are included in a range of a top left (0, 0) to a right bottom (j−1, j−1) of the one-eye image.

In Step S705, the control unit 101 determines whether or not processing in Steps S706 to S710 has been performed on each of all the pixels in the equirectangular image in one frame. When it is determined that the processing in Steps S706 to S710 has been performed on each of all the pixels, the flow advances to Step S711. When it is determined that the processing in Steps S706 to S710 has not been performed on at least any of all the pixels, the flow advances to Step S706.

In Step S706, the control unit 101 obtains coordinates (xL, yL) of the circular fisheye image corresponding to coordinates (x, y) of a pixel to be processed in the left-eye image. The coordinates in the circular fisheye image corresponding to the coordinates in the equirectangular image can be calculated by performing conversion inverse to the equirectangular conversion. At this time, the control unit 101 determines the coordinates (xL, yL) in the circular fisheye image on the basis of the common meta data read in Step S501 and manual correction parameter values set by the user. The control unit 101 also determines the coordinates (xL, yL) in the circular fisheye image on the basis of the shake correction value acquired in Step S703 in consideration of shake correction in the equirectangular image.

In Step S707, the control unit 101 determines coordinates (xR, yR) in the circular fisheye image corresponding to the coordinates (x, y) of a pixel to be processed in the right-eye image. This is the same processing as that in Step S706.

In Step S708, the control unit 101 determines whether or not both of the two coordinates (xL, yL) and (xR, yR) belong to the inside of a valid region. In the first embodiment, the valid region is the image circle (shooting region). When it is determined that the both coordinates are coordinates in the image circle, the flow advances to Step S710. When it is determined that at least either one of the both coordinates is not in the image circle, the flow advance to Step S709.

In Step S709, the control unit 101 determines that a pixel in the equirectangular image to be processed is the invalid pixel, and stores the coordinates (x, y) of the pixel in an invalid coordinate table. The invalid coordinate table is used commonly to all the frames of the VR video. Accordingly, in the invalid coordinate table, coordinates of pixels determined to be the invalid pixels in at least any of the frames are registered. Therefore, by thus controlling the invalid coordinate table, the control unit 101 can set, as the invalid region, a set of the coordinates (invalid coordinates) of the pixels determined to be the invalid pixels in at least any of the frames.

In Step S710, the control unit 101 updates the coordinates (x, y) to coordinates of a next pixel. The coordinates of the next pixel are coordinates obtained by adding one to x, which is an X-coordinate. However, when the X-coordinate obtained by adding one to x reaches the width j, the coordinates of the next pixel are coordinates obtained by adding one to y, which is a Y-coordinate, and returning x, which is the X-coordinate, to zero.

In Step S711, the control unit 101 adds 1 to the variable i representing the frame number.

Processing in Step S504

Figure 8:
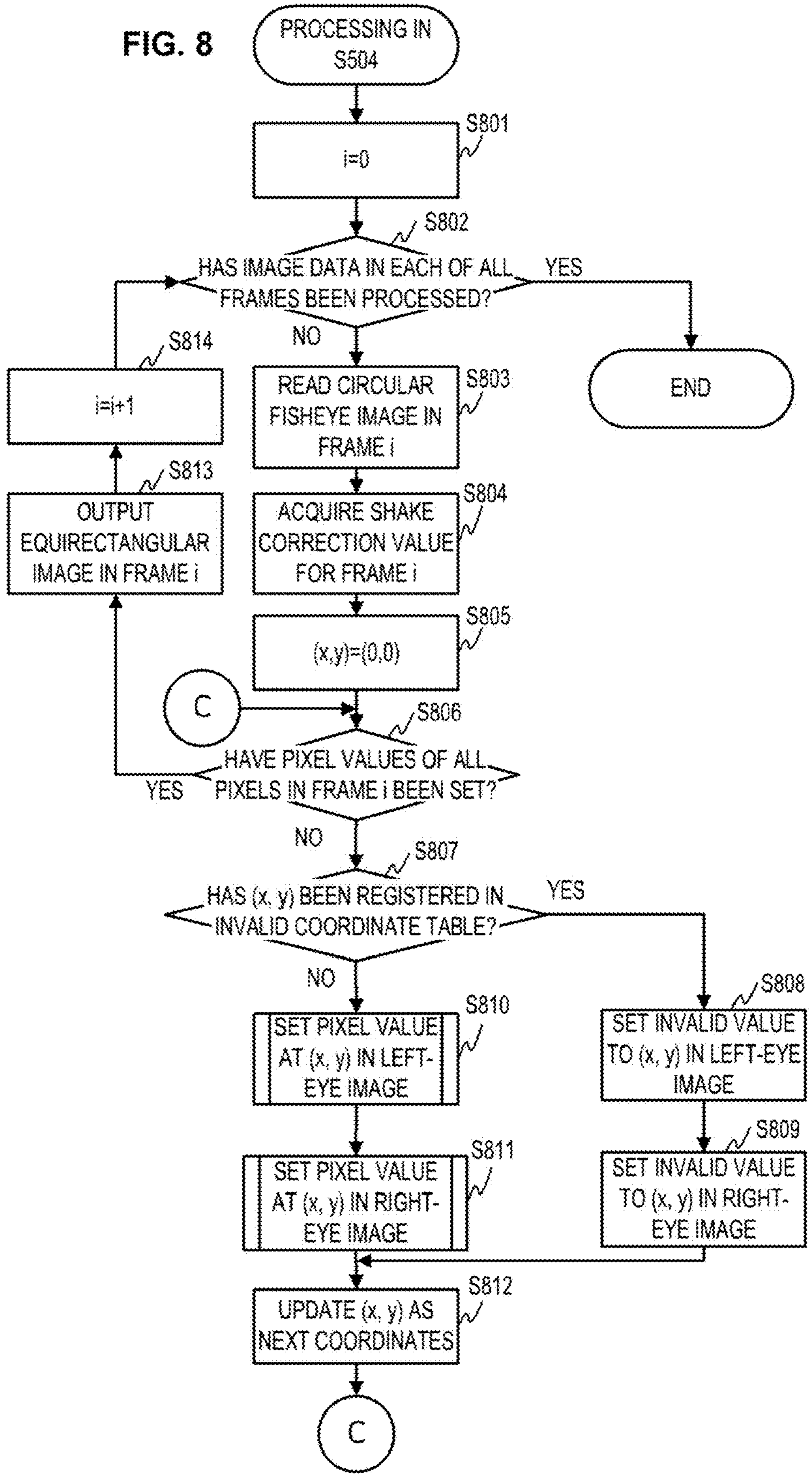
FIG. 8 is a flow chart of processing of generating equirectangular images according to the first embodiment.

Referring to a flow chart of FIG. 8, a description will be given of processing of generating the equirectangular image from the circular fisheye image for each of all the frames.

In Step S801, the control unit 101 sets the variable i representing the frame number to 0.

In Step S802, the control unit 101 determines whether or not the equirectangular image in each of all the frames included in the VR video has been output. When it is determined that the equirectangular image in each of all the frames has been output, the processing in the present flow chart is ended. When it is determined that the equirectangular image in at least any of all the frames has not been output, the flow advances to Step S803.

In Step S803, the control unit 101 reads the image data of the circular fisheye image in the frame i from the video sampling region 3031 through the input unit. When the image data stored in the video sampling region 3031 is compressed, the control unit 101 decodes the image data to convert the image data to an RGB format.

In Step S804, the control unit 101 acquires the shake correction value for the frame i. Processing in Step S804 is the same processing as the processing in Step S703.

In Step S805, the control unit 101 sets the coordinates (x, y) of the pixel to be processed in the equirectangular image to (0, 0). Similarly to the processing in the flow chart of FIG. 7, processing for both of the left-eye image and the right-eye image is performed in one loop (Steps S806 to S812) herein. Accordingly, when it is assumed that the width of the one-eye image is j pixels and a height thereof is j rows, coordinates in the one-eye image ranges from the top left (0, 0) to the right bottom (j−1, j−1).

In Step S806, the control unit 101 determines whether or not the pixel values of all the pixels in the equirectangular image in the frame i have been set. When it is determined that the pixel values of all the pixels in the equirectangular image in the frame i have been set, the flow advances to Step S813. When it is determined that the pixel value of at least any of all the pixels in the equirectangular image in the frame i has not been set, the flow advances to Step S807.

In Step S807, the control unit 101 determines whether or not the coordinates (x, y) of the pixel to be processed have been registered in the invalid coordinate table (i.e., the pixel at the coordinates (x, y) is included in the invalid region). When it is determined that the coordinates (x, y) have been registered in the invalid coordinate table, the flow advances to Step S808. When it is determined that the coordinates (x, y) have not been registered in the invalid coordinate table, the flow advances to Step S810.

In Step S808, the control unit 101 sets a pixel value indicating invalidity (invalid pixel value) to the pixel value at the coordinates (x, y) in the left-eye image in the equirectangular image. For example, the pixel value indicating invalidity is a specific pixel value such as a pixel value representing black, a pixel value representing white, or a pixel value representing blue.

In Step S809, the control unit 101 sets the pixel value indicating invalidity to the pixel value at the coordinates (x, y) in the right-eye image in the equirectangular image. According to Steps S808 and S809, in the left-eye image and the right-eye image in the equirectangular image, the pixel value indicating invalidity is set to each of the invalid regions at the same position and having the same shape.

In Step S810, the control unit 101 sets, on the basis of the shake correction value, the pixel value at the coordinates (x, y) in the left-eye image in the equirectangular image. In Step S811, the control unit 101 sets, on the basis of the shake correction value, the pixel value at the coordinates (x, y) in the right-eye image in the equirectangular image. Thus, the pixel value of the pixel in the equirectangular image is set on the basis of the shake correction value to allow the equirectangular image with a reduced effect of the camera shake to be generated. Accordingly, in a case when the object to be imaged is not moving and camera shake is observed, in a plurality of consecutive frames, positions in the equirectangular image at which the imaged object is seen can be maintained at a given position. Details of the processing in Steps S810 and S811 will be described later with reference to the flow chart of FIG. 9.

In Step S812, the control unit 101 updates the coordinates (x, y) to the coordinates of the next pixel. The coordinates of the next pixel are coordinates obtained by adding one to x, which is the X-coordinate. However, when the X-coordinate obtained by adding one to x reaches the width j, the coordinates of the next pixel are coordinates obtained by adding one to y, which is the Y-coordinate, and returning x, which is the X-coordinate, to zero. Note that, by repeating the processing in Steps S807 to S812 for each of the pixels in the equirectangular image in one frame, the pixel value of each of the pixels in the equirectangular image in the frame is set and, consequently, the equirectangular image in the frame is generated.

In Step S813, the control unit 101 outputs the equirectangular image in the frame number i, which is generated in Step S803 to Step S812. In a case when the equirectangular image is stored in a file, the equirectangular image is output to the external storage apparatus 104. In a case when the equirectangular image is displayed, the equirectangular image is output to the display unit 106.

In Step S814, the control unit 101 adds one to the variable i representing the frame number.

Referring to the flow chart of FIG. 9, a description will be given of processing of setting the pixel value of one pixel in the equirectangular image.

In Step S901, the control unit 101 calculates, on the basis of the shake correction value, or the like, coordinates (X, Y) of the circular fisheye image corresponding to the coordinates (x, y) in the equirectangular image. The processing in Step S901 is the same processing as the processing in Steps S706 and S707 in FIG. 7.

In Step S902, the control unit 101 acquires the pixel value at the coordinates (X, Y) of the circular fisheye image. Alternatively, the control unit 101 acquires, as the pixel value at the coordinates (X, Y), a pixel value obtained by performing interpolation using a bicubic method, or the like, on the basis of the number of the pixels around the coordinates (X, Y) calculated in Step S901.

In Step S903, the control unit 101 sets the pixel value acquired in Step S902 as a pixel value at the coordinates (x, y) in the equirectangular image.

According to the first embodiment, in a case when shake correction differing from one frame to another is performed, even when the equirectangular image is generated from the circular fisheye image, it is possible to provide each of the invalid regions formed in the equirectangular image with the same position and the same shape throughout all the frames. This can suppress flickering caused by changes in the shape and position of the invalid region during reproduction of the VR video (equirectangular image).

Second Embodiment

Figure 10A:
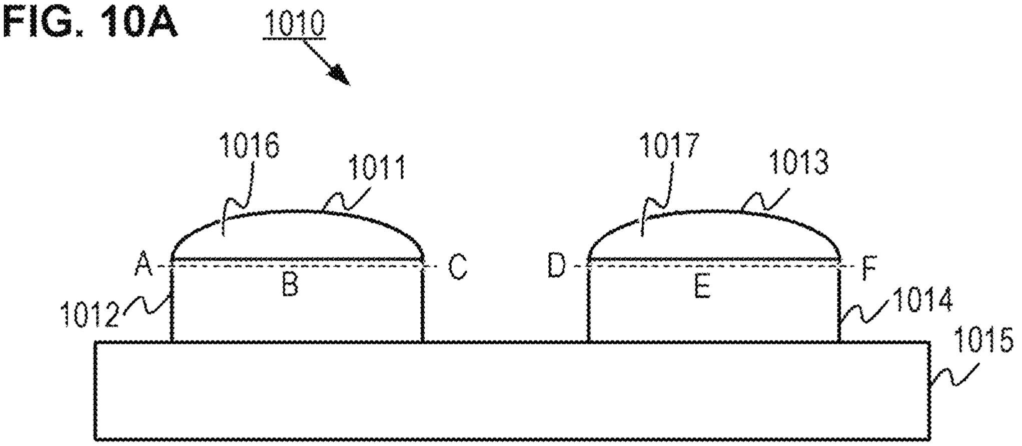
FIG. 10A is a diagram illustrating fisheye lenses according to a second embodiment.
Figure 10B:
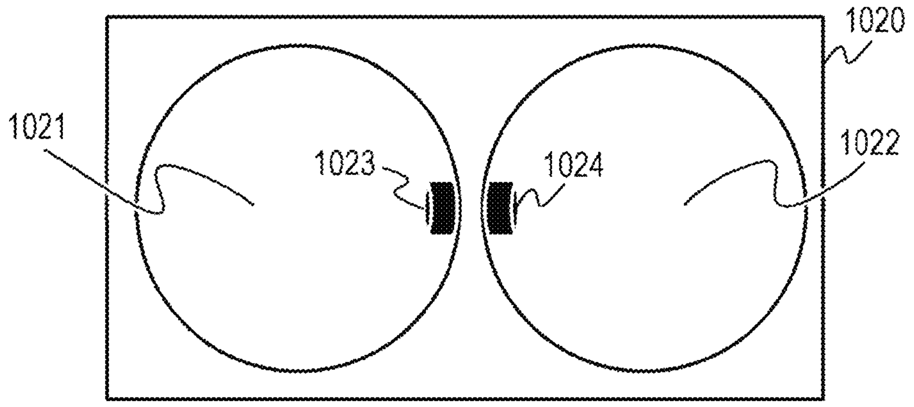
FIG. 10B is a diagram illustrating circular fisheye images.

FIG. 10A is a diagram illustrating an example of a double fisheye lens according to a second embodiment. FIG. 10B is a diagram illustrating an example of the circular fisheye image acquired by a camera with the double fisheye lens mounted therein.

In FIG. 10A, a double fisheye lens 1010 is the double fisheye lens viewed from above. The double fisheye lens 1010 is used to acquire two circular fisheye images. The double fisheye lens 1010 includes a glass portion 1011, a support 1012, a glass portion 1013, a support 1014, and a support 1015.

The glass portion 1011 is a glass portion of a left-eye fisheye lens. The support 1012 is a support for the glass portion 1011 of the left-eye fisheye lens.

The glass portion 1013 is a glass portion for a right-eye fisheye lens. The support 1014 is a support for the glass portion 1013 of the right-eye fisheye lens. The support 1015 is a support for the left and right two fisheye lenses.

An angle of view 1016 connecting a line segment AB and a line segment BC is an angle of view of a shooting range of the left-eye fisheye lens. In the left-eye fisheye lens, the angle of view 1016 is a one hundred eighty-degree angle of view. An angle of view 1017 connecting line segments DE and EF is an angle of view of a shooting range of the right-eye fisheye lens. Similarly to the angle of view 1016, the angle of view 1017 is a one hundred eighty-degree angle of view.

A circular fisheye image 1020 is an example of a circular fisheye image acquired by the camera with the double fisheye lens 1010 mounted therein.

An image circle 1021 is an image circle corresponding to the glass portion 1011. An image circle 1022 is an image circle corresponding to the glass portion 1013.

When the positions of the two lenses are close to each other and the angle of view of the shooting range of each of the lenses is close to one hundred eighty degrees as in the double fisheye lens 1010, into a shooting range using one of the lenses, another of the lenses goes.

An image 1023 is an image of the glass portion 1013 reflected on the glass portion 1011. Likewise, an image 1024 is an image of the glass portion 1011 reflected on the glass portion 1013. These images are in the image circles, and can, therefore, be subjected to equirectangular conversion. In addition, due to parameter values for camera shake correction (parameter values for the equirectangular conversion), positions in an equirectangular image where these images are reflected are not constant. Meanwhile, when the two fisheye lenses have a fixed positional relationship therebetween as in the double fisheye lens 1010, the positions in the circular fisheye image where these images are reflected are constant.

Figure 11:
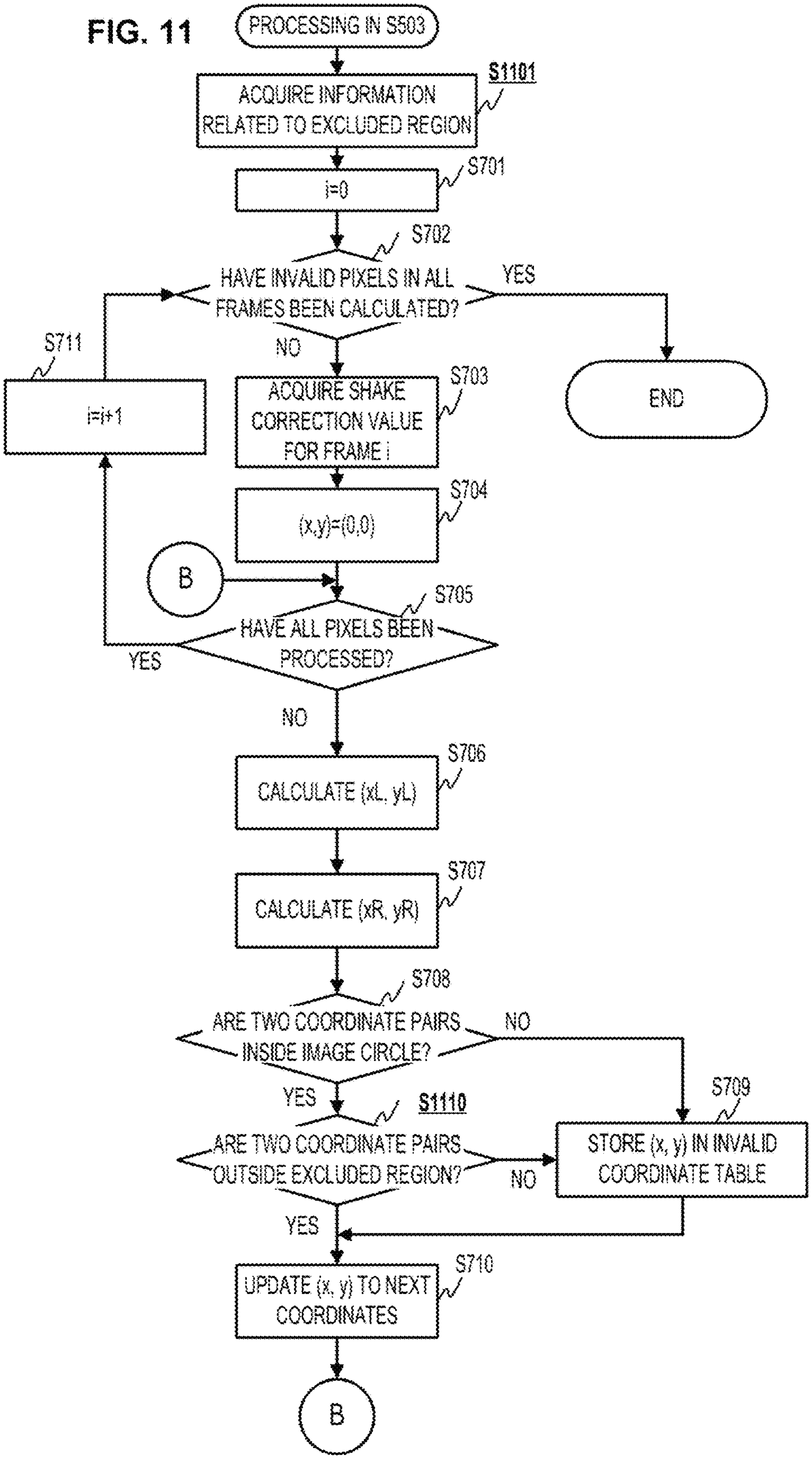
FIG. 11 is a flow chart of processing of calculating an invalid region according to a second embodiment.

Referring to FIG. 11, a description will be given of processing of calculating the invalid regions in the equirectangular image in all the frames in the second embodiment. The processing is equivalent to Step S503 in the flow chart of FIG. 5 according to the first embodiment. Except for Step S503, the same processing as in each of the steps in the flow chart of FIG. 5 is performed. In addition, in Steps S701 to S711 in the flow chart of FIG. 11, the same processing as in the step of the same name in the flow chart of FIG. 7 is performed.

In Step S1101, the control unit 101 acquires information related to an excluded region specified in advance in the image circle of the circular fisheye image. The information related to the excluded region is, e.g., information related to coordinates in images (the image 1023 and the image 1024), which are not needed as the VR images in the image circle of the circular fisheye image 1120, as illustrated in FIG. 10B. A reflecting region of the lens has a constant position in the circular fisheye image, and, therefore, it is possible to preliminarily calculate coordinates of this position and preliminarily store the coordinates in the form of a coordinate table or a mask image.

In Step S1110, the control unit 101 determines whether or not each of the two coordinates (xL, yL) and (xR, yR) of the circular fisheye image, which are obtained in Step S706 and S707, is a coordinate outside of the excluded region. When it is determined that both coordinate pairs are coordinates outside of the excluded region, the flow advances to Step S710. When it is determined that at least one of the coordinates is a coordinate inside of the excluded region, the flow advances to Step S709.

According to the second embodiment, coordinates in the excluded region inside of the image circle of the circular fisheye image are also regarded as a region other than the valid region, similarly to the region outside of the image circle. In other words, the region in the equirectangular region corresponding to the excluded region is also regarded as the invalid region. Accordingly, an unneeded image corresponding to the excluded region is not displayed in the equirectangular image and the shape of the invalid region does not vary from one frame to another, and, therefore, it is possible to suppress flickering of the VR video and improve a sense of immersion of the user in the VR video.

Third Embodiment

In each of the first and second embodiments, to calculate the invalid region, calculation in a direction inverse to that of the equirectangular conversion is performed. It can be considered that such processing involves a large amount of calculation, and requires a long processing time. However, depending on cases, it is desired to calculate the invalid region of the equirectangular image within a short processing time, though accuracy of the invalid region may be low. Therefore, in a third embodiment, a description will be given of the editing apparatus 100 capable of calculating the invalid region of the equirectangular image within a short processing time by calculating the invalid region depending on shaking of the camera in each of the four directions during shooting.

Referring to a flow chart of FIG. 12, a description will be given of processing of calculating the shake correction value (processing corresponding to Step S502 in a flow chart of FIG. 5 according to the first embodiment) in the third embodiment.

Figure 6:
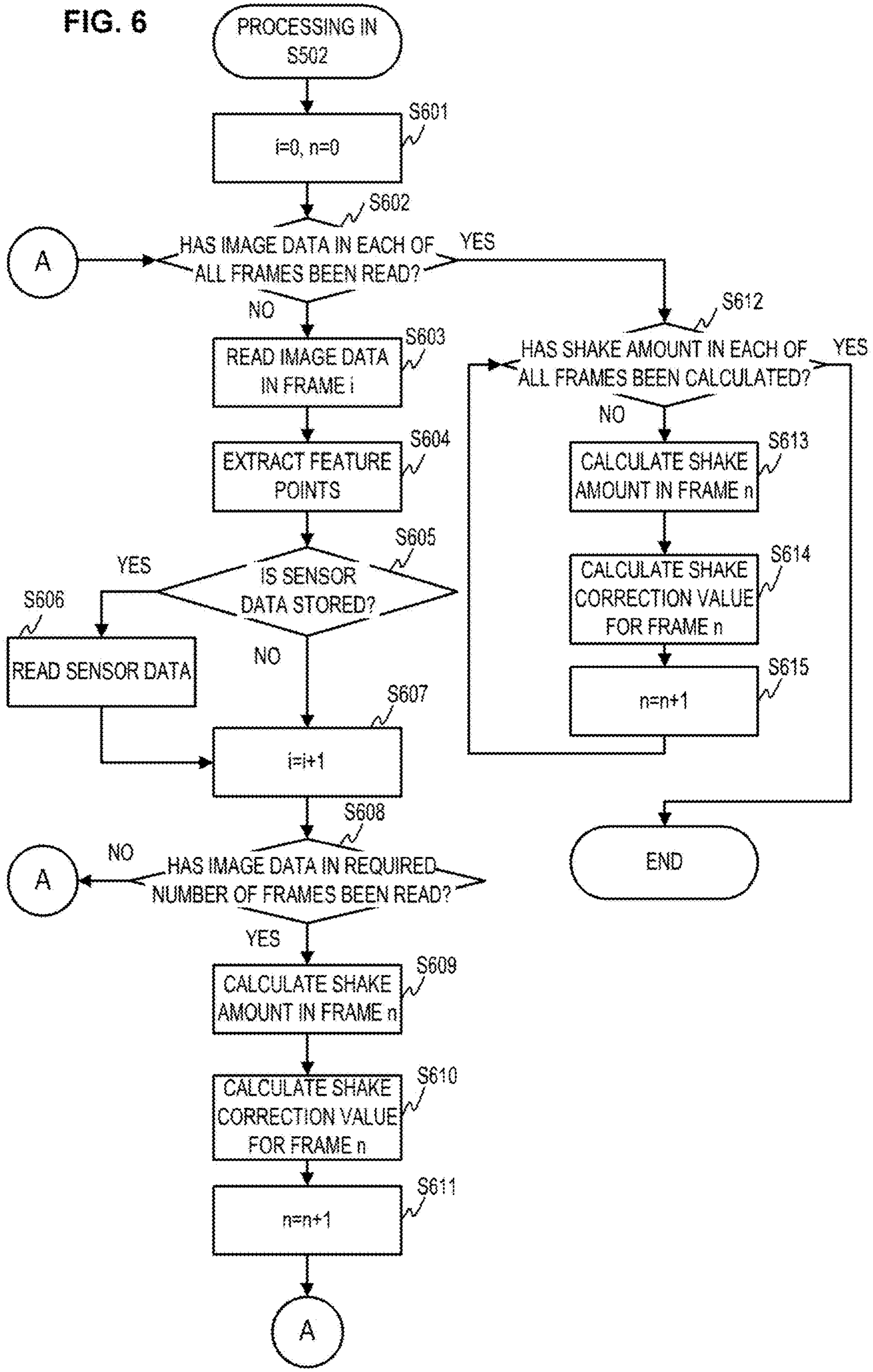
FIG. 6 is a flow chart of processing of calculating a shake correction value according to the first embodiment.
Figure 12:
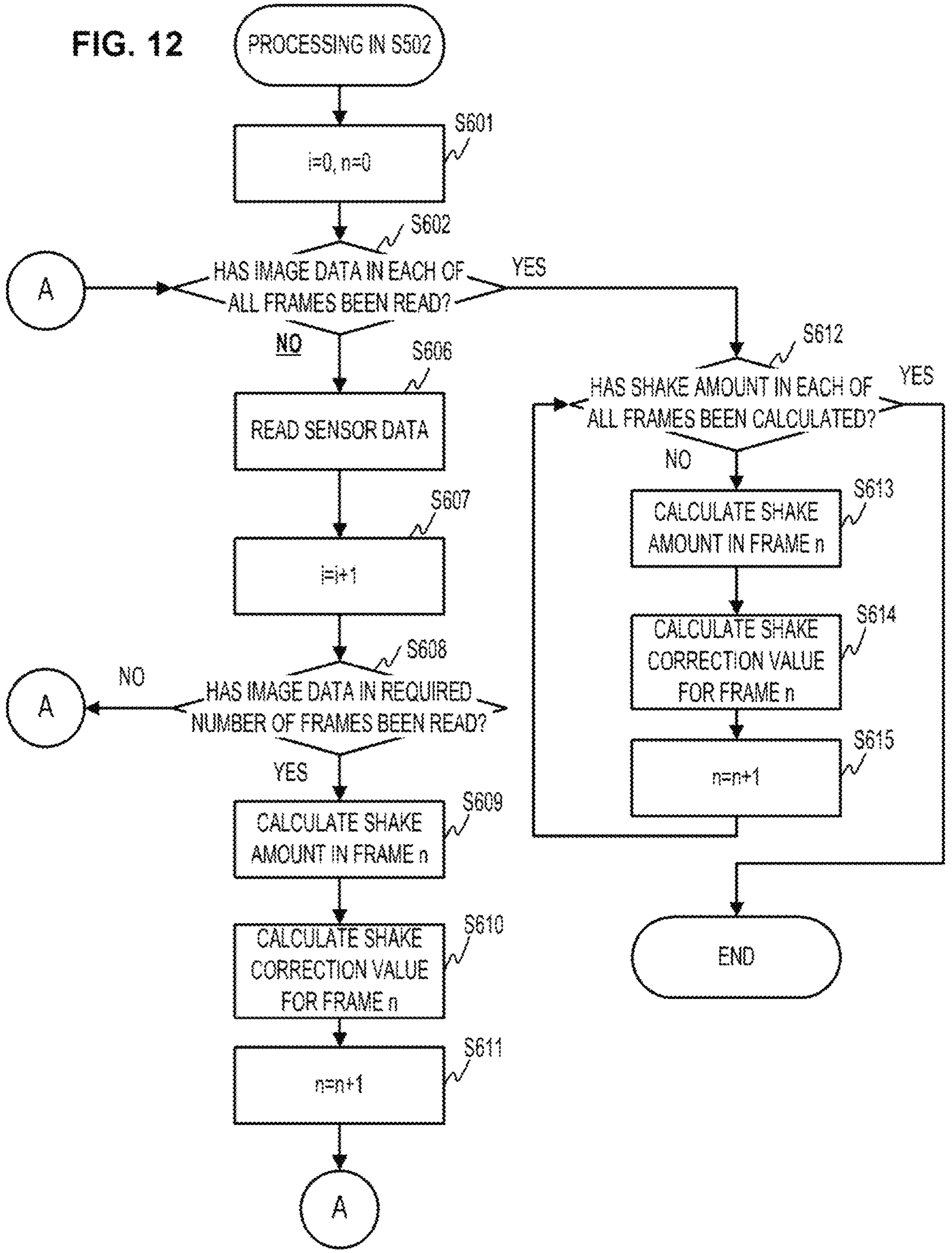
FIG. 12 is a flow chart of processing of calculating a shake correction value according to a third embodiment.

In the flow chart of FIG. 12, processing in Steps S601, S602, and S606 to S615 is the same as the processing of the same name in the flow chart of FIG. 6. Meanwhile, in the flow chart of FIG. 12, when it is determined in Step S602 that the image data in any of all the frames has not been read, the flow advances to Step S606. In other words, since the processing (more specifically, processing of extracting feature points in Step S604) in Steps S603 to S605 is not performed, the number of processing in the editing apparatus 100 can be reduced.

Figure 13:
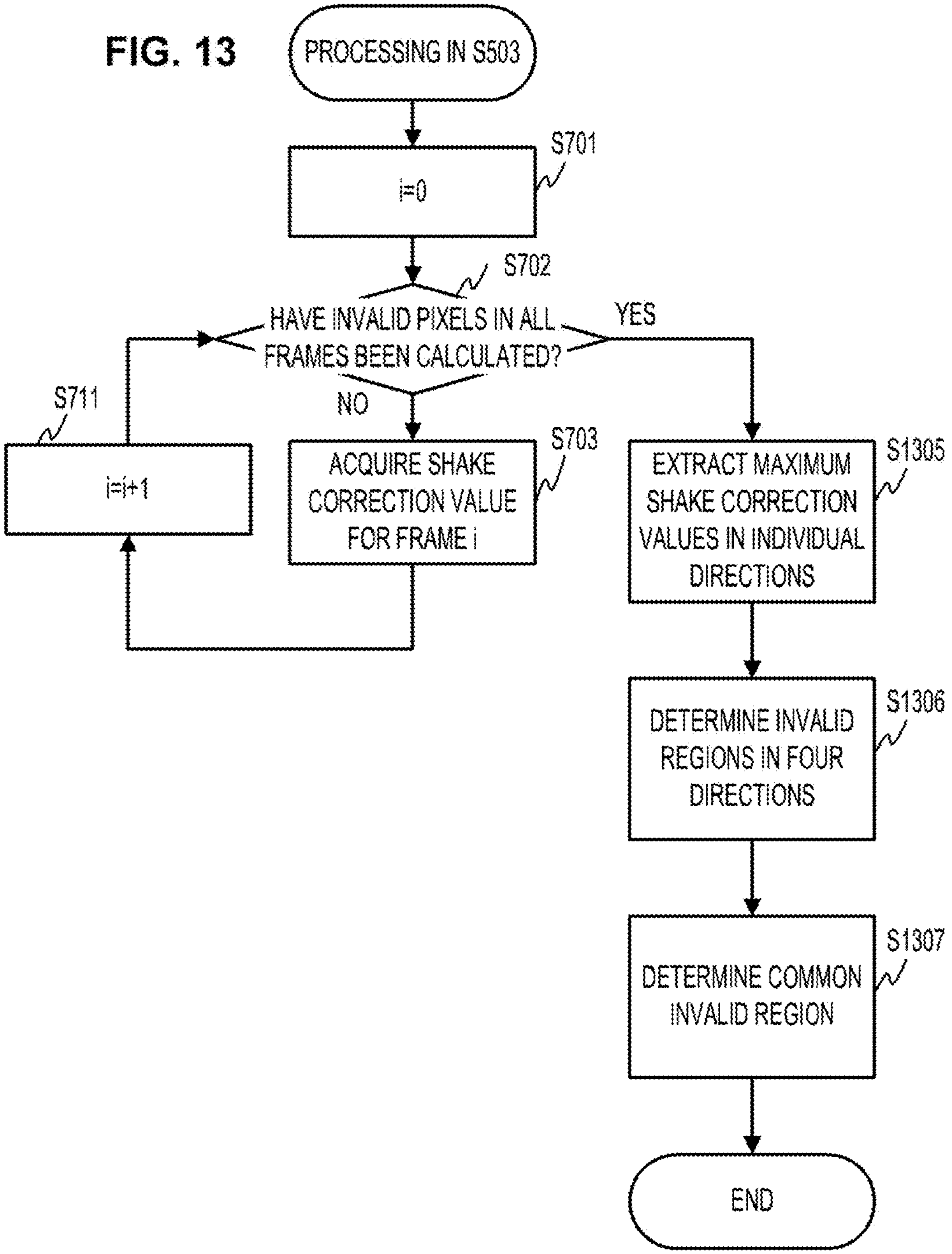
FIG. 13 is a flow chart of processing of calculating an invalid region according to the third embodiment.

Referring to a flow chart of FIG. 13, a description will be given of processing (processing in Step S503) of calculating the invalid regions in the equirectangular image in all the frames in the third embodiment. Processing in Steps S701 to S703 and S711 in the flow chart of FIG. 13 is the same as the processing in the step of the same name in the flow chart of FIG. 7.

In Step S1305, the control unit 101 acquires respective maximum shake correction values in the four directions among the shake correction values acquired in Step S703. The maximum shake correction values in the fourth directions are a maximum shake correction value in a positive X-axis direction, a maximum shake correction value in a negative X-axis direction, a maximum shake correction value in a positive Y-axis direction, and a maximum shake correction value in a negative Y-axis direction. The maximum shake correction values in the four directions are values according to magnitudes of camera shakes in the four directions resulting from camera shake.

In Step S1306, the control unit 101 determines the invalid regions according to the maximum shake correction values in the individual directions, which have been determined in Step S1305. This can be achieved by, e.g., preparing mask images for the invalid regions in several steps corresponding to the shake correction values in the individual directions in advance and choosing the mask images for the invalid regions according to the shake correction values equal to or more than the maximum shake correction values in the individual directions.

Figure 14:
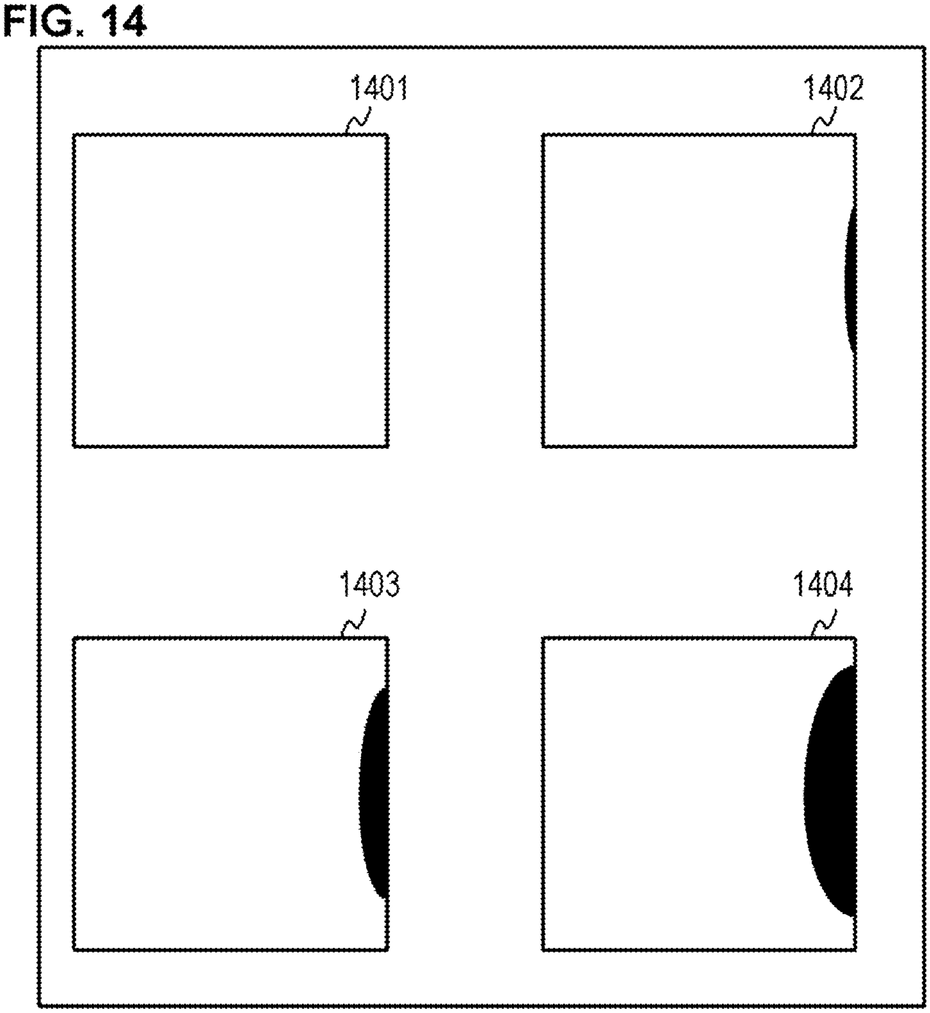
FIG. 14 is a diagram illustrating a mask image according to the third embodiment.

For example, FIG. 14 illustrates mask images for four types of invalid regions prepared in advance according to the shake correction value in the positive X-axis direction. A mask image 1401 is a mask image when the shake correction value in the positive X-axis direction is zero. A mask image 1402 is a mask image when the shake correction value in the positive X-axis direction is small. A mask image 1403 is a mask image when the shake correction value in the positive X-axis direction is intermediate. A mask image 1404 is a mask image when the shake correction value in the positive X-axis direction is large. Note that, in each of the mask images, a region represented in black is the invalid region.

Thus, in the mask image according to the shake correction value in the positive X-axis direction, the region representing the invalid region appears on a right side of the image. Meanwhile, in the mask image according to the shake correction value in the negative X-axis direction, the region representing the invalid region appears on a left side of the image.

Likewise, in the mask image according to the shake correction value in the positive Y-axis direction, the region representing the invalid region appears below the image while, in the mask image according to the shake correction value in the negative Y-axis direction, the region representing the invalid region appears above the image.

In Step S1307, the control unit 101 acquires a logical OR of the mask images for the invalid regions in the four directions, which have been determined in Step S1306, as an invalid region common to the VR video (all the frames).

Figure 15:
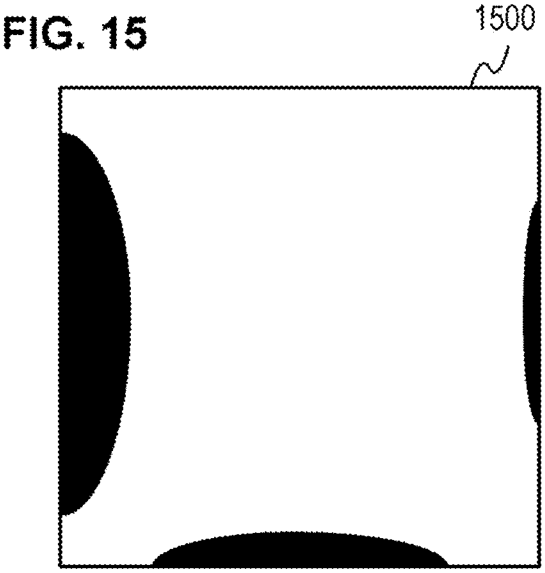
FIG. 15 is a diagram illustrating the mask image according to the third embodiment.

For example, a case is assumed in which the mask image when the shake correction value in the positive X-axis direction is small, the mask image when the shake correction value in the negative X-axis direction is large, the mask image when the shake correction value in the positive Y-axis direction is intermediate, and the mask image when the shake correction value in the negative Y-axis direction is 0 are selected. In this case, the control unit 101 acquires such a mask image 1500 as to represent the invalid regions (regions represented in black) corresponding to the logical OR of the four mask images 1500, as illustrated in FIG. 15.

Figure 7:
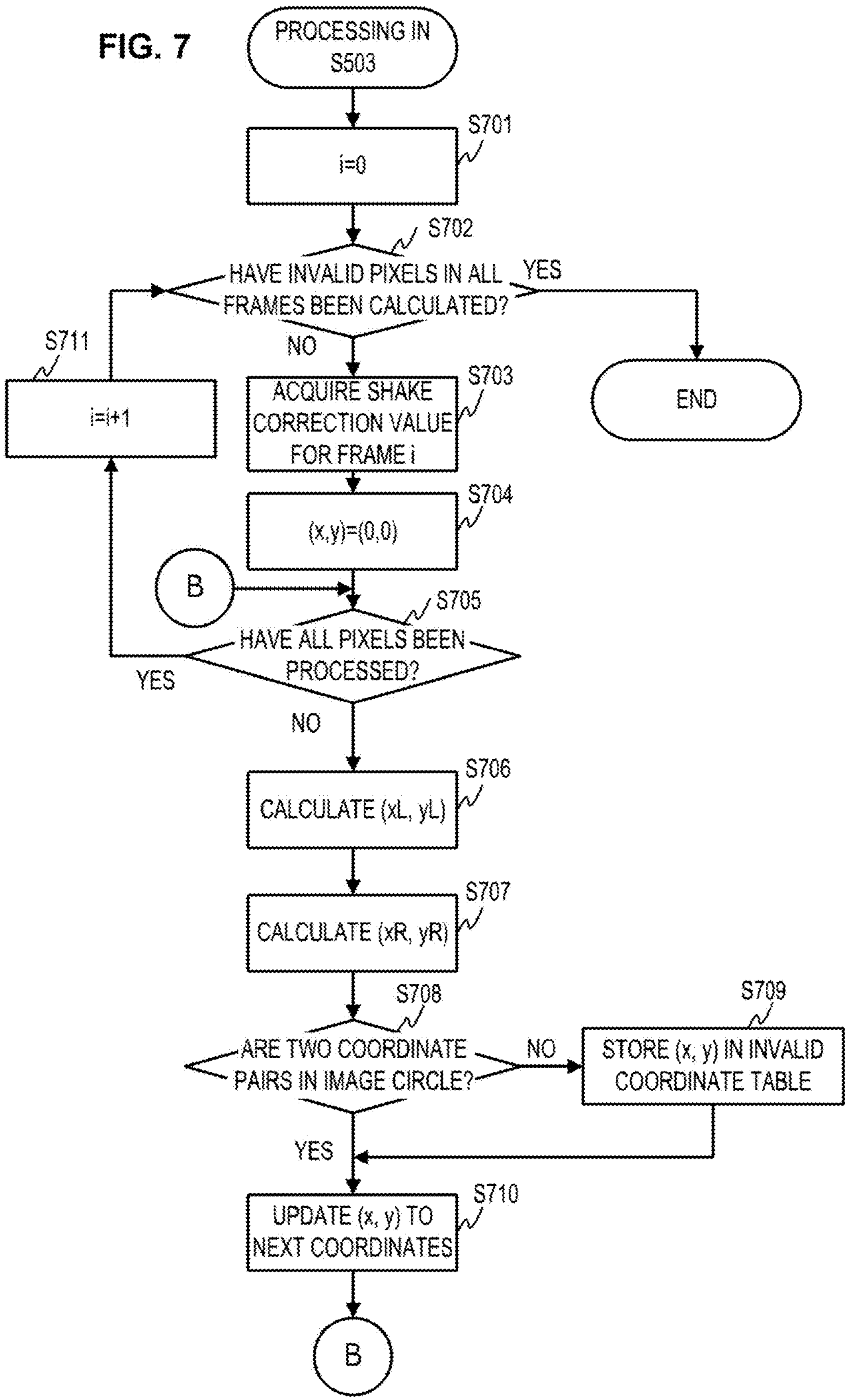
FIG. 7 is a flow chart of processing of calculating an invalid region according to the first embodiment.

According to the third embodiment, there is no loop processing for each of the pixels in Steps S705 to S710 in the flow chart of FIG. 7, and, therefore, it is possible to calculate the invalid region of the equirectangular image with a small amount of processing and within a short processing time.

Fourth Embodiment

Information on the invalid regions in the equirectangular images previously calculated can be used again in a case when a specified condition is satisfied. Examples of the case when the specified condition is satisfied include a case when the method of calculating the invalid region is the same and the manual correction parameters are also the same.

Figure 16:
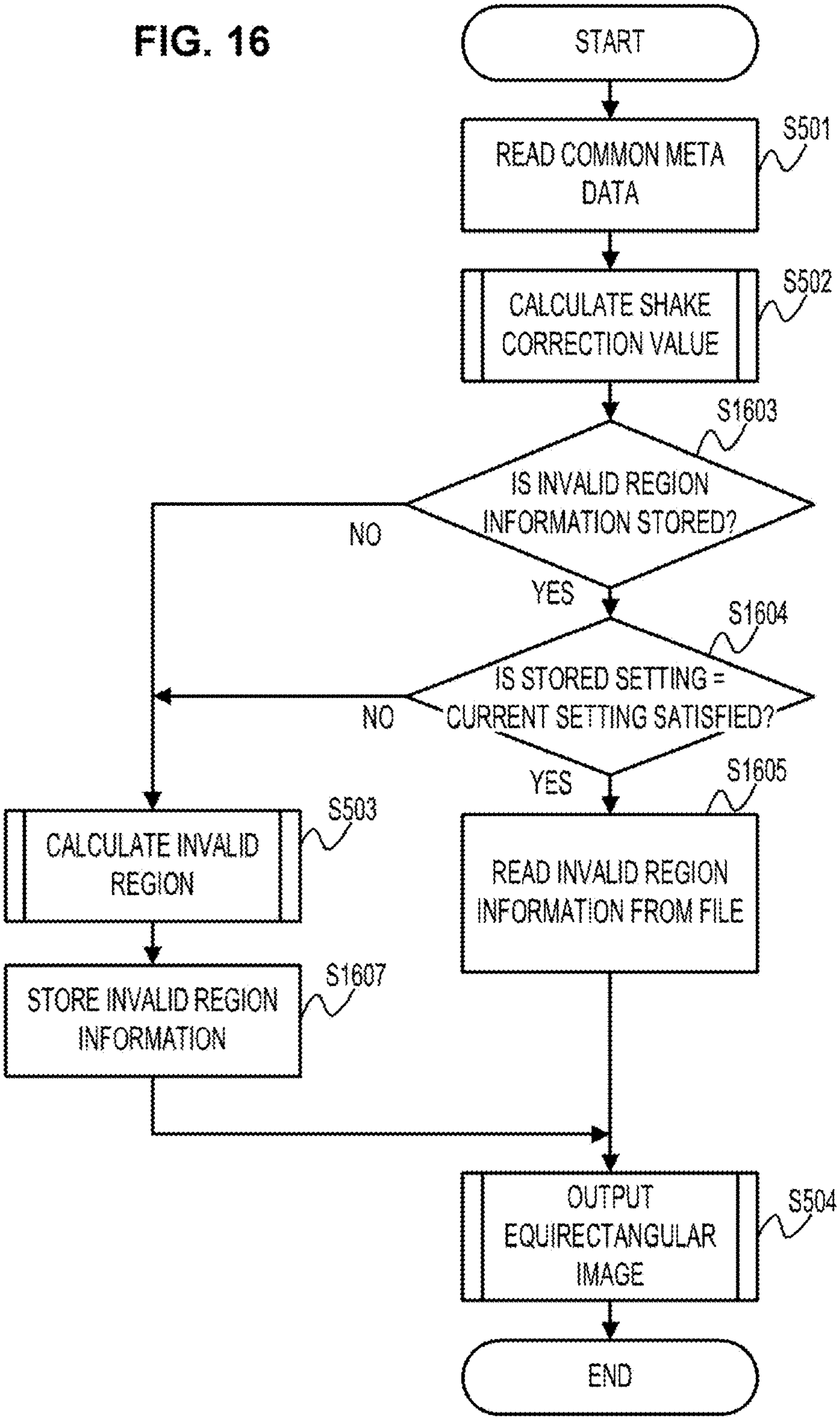
FIG. 16 is a flow chart of processing of generating a VR video according to a fourth embodiment.

Referring to a flow chart of FIG. 16, a description will be given of processing of generating a VR video according to a fourth embodiment. Note that, in Steps S501 to S504 in the flow chart of FIG. 16, the same processing as in the step of the same name in the flow chart of FIG. 5 is performed.

In Step S1603, the control unit 101 determines whether or not invalid region information (information including the invalid region, setting for calculating the invalid region, and the like) of the equirectangular image is stored in a file. When it is determined that the invalid region information is stored in the file (i.e., the information related to the invalid region calculated during previous image conversion is stored in the file), a flow advances to Step S1604. When it is determined that the invalid region information is not stored in the file, the flow advances to Step S503. The file in which the invalid region information of the equirectangular image is stored herein may be the video file, or may be a file other than the video file.

In Step S1604, the control unit 101 determines whether or not the invalid region of the equirectangular image stored in the file has been calculated on the basis of the same setting as the current setting. Examples of the "setting" mentioned herein include a method of calculating the invalid region or the manual correction parameter values. When it is determined that the invalid region has been calculated on the basis of the same setting as the current setting, a flow advances to Step S1605. When it is determined that the invalid region has not been calculated on the basis of the same setting as the current setting, the flow advances to Step S503.

In Step S1605, the control unit 101 reads the invalid region information of the equirectangular image stored in the file. By the processing, the equirectangular image (VR video) is generated on the basis of the invalid region information in Step S504 subsequent thereto.

In Step S1607, the control unit 101 stores, in the file, the invalid region of the equirectangular image in the video file calculated by Step S503, the setting for calculating the invalid region, the manual correction parameters, and the like, as the invalid region information. It is to be noted herein that the file in which the invalid region information is to be stored may be the video file or the file other than the video file.

According to the fourth embodiment, when the appropriate invalid region information is stored in advance, the processing of calculating the invalid region can be omitted, and, therefore, the equirectangular image can be generated at a higher speed.

Fifth Embodiment

A plurality of the video files may be continuously reproduced as one video. Accordingly, in a fifth embodiment, the editing apparatus 100 performs control such that the positions and shapes of the invalid regions do not vary not on a per video-file basis, but on a per reproduction basis (throughout the plurality of video files).

Figure 17:
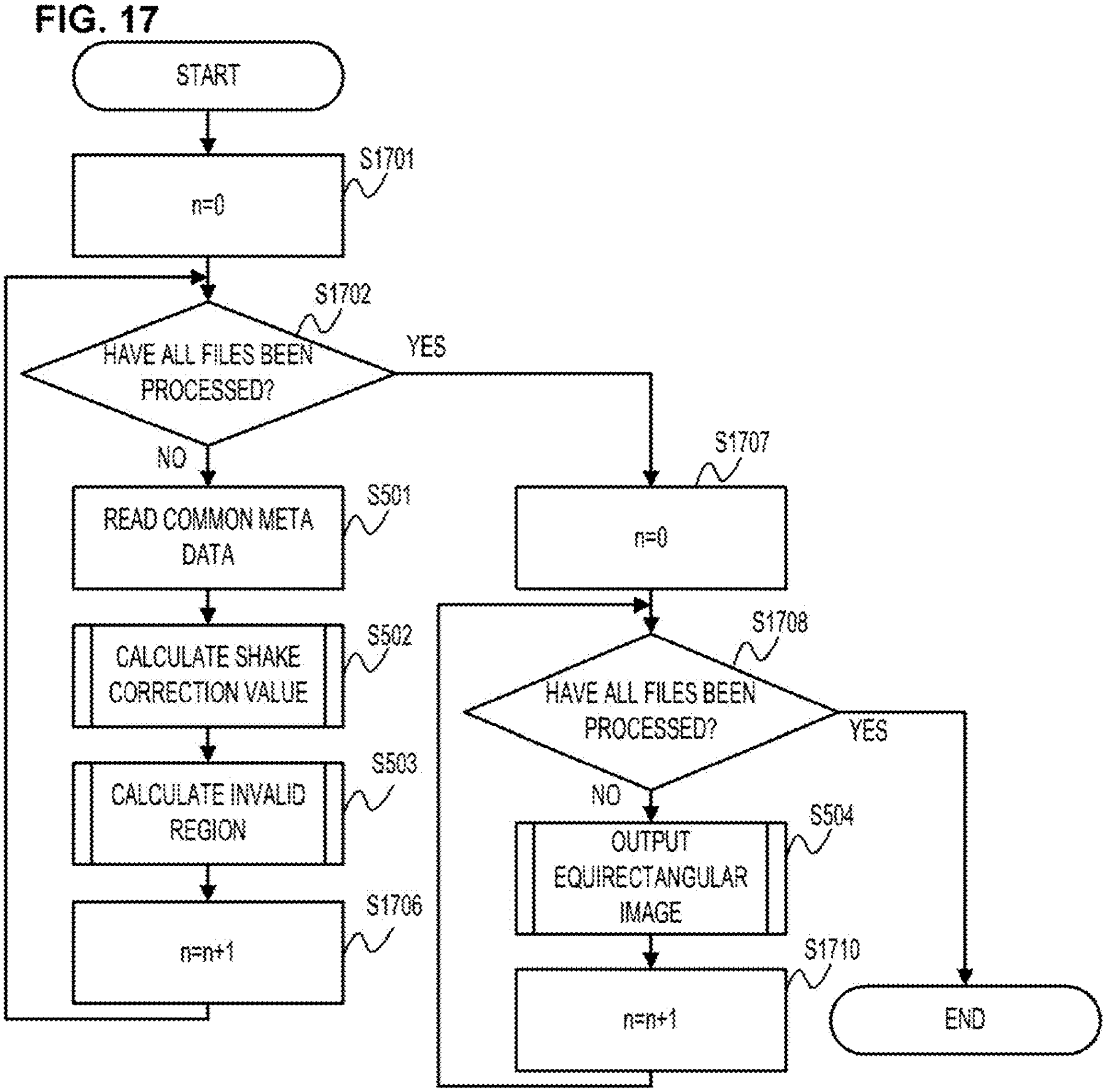
FIG. 17 is a flow chart of processing of generating a VR video according to a fifth embodiment.

Referring to a flow chart of FIG. 17, a description will be given of a method of generating the equirectangular images from the circular fisheye images with regard to the plurality of video files and generating the VR videos in the fifth embodiment. In the flow chart of FIG. 17, Steps S501 to S504 are the same as Steps S501 to S504 in the flow chart of FIG. 5. In the flow chart of FIG. 17, in Steps S501 to S504, processing is performed for the video file of the file number n.

Note that, in Step S503, with regard to all the video files to be continuously reproduced (all the video files that can continuously be reproduced), the same invalid coordinate table is used. As a result, in the invalid coordinate table, coordinates of a pixel determined to be the invalid pixel in any of frames of any of the video files are registered. In Step S504 also, using the same invalid coordinate table for each of the video files, the equirectangular image is output (generated).

In Step S1701, the control unit 101 sets the variable n representing the file number of the video file to zero.

In Step S1702, the control unit 101 determines, for each of all the video files, whether or not the processing in Steps S501 to S503 has been performed. When it is determined that the processing in Steps S501 to S503 has been performed for each of all the video files, a flow advances to Step S1707. When it is determined that the processing in Steps S501 to S503 has not been performed for at least any of all the video files, the flow advances to Step S501.

In Step S1706, the control unit 101 adds one to the variable n representing the file number.

In Step S1707, the control unit 101 sets the variable n representing the file number to zero again.

In Step S1708, the control unit 101 determines whether or not processing in Step S504 has been performed for each of all the video files. When it is determined that the processing in Step S504 has been performed for each of all the video files, the processing in the present flow chart is completed. When it is determined that the processing in Step S504 has not been performed for any of all the video files, the processing in the present flow chart advances to Step S504.

In Step S1710, the control unit 101 adds one to the variable n representing the file number.

In the fifth embodiment, it is possible to provide each of the invalid regions formed in the equirectangular images with the same position and the same shape throughout all the frames of the plurality of video files. Thus, during reproduction of each of the equirectangular images in the plurality of video files, it is possible to suppress flickering caused by changes in the shape of the invalid region.

Sixth Embodiment

In a sixth embodiment, the editing apparatus 100 arithmetically determines the equirectangular image from the circular fisheye image on the basis of the image correction information such as the shake correction value (correction value for correcting camera shape). In addition, the editing apparatus 100 generates such a mask image (image mask or mask) as to partially cover the equirectangular image on the basis of the image correction information. The circular fisheye image in the sixth embodiment has two image circles (shooting regions).

Figure 18:
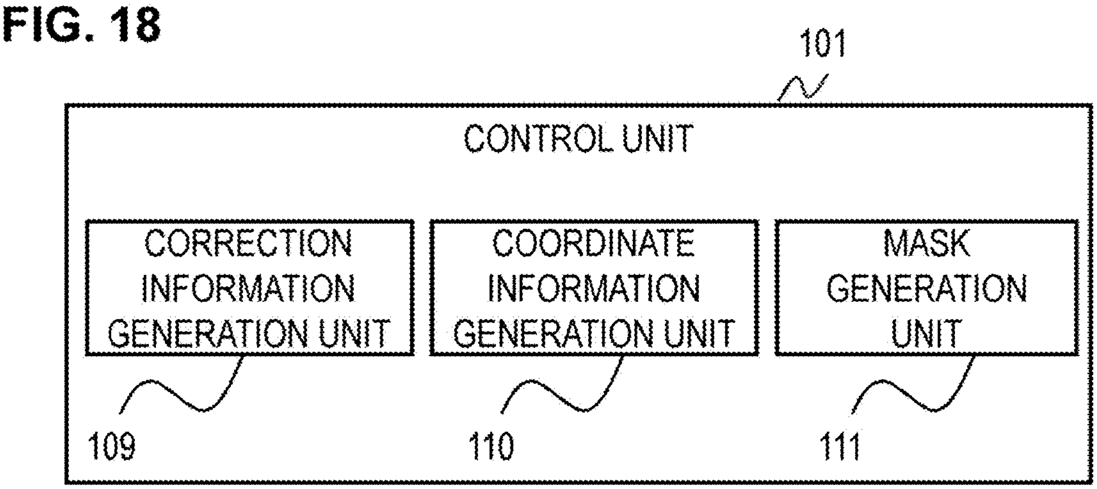
FIG. 18 is a configuration diagram of a control unit according to a sixth embodiment.
Figure 19:
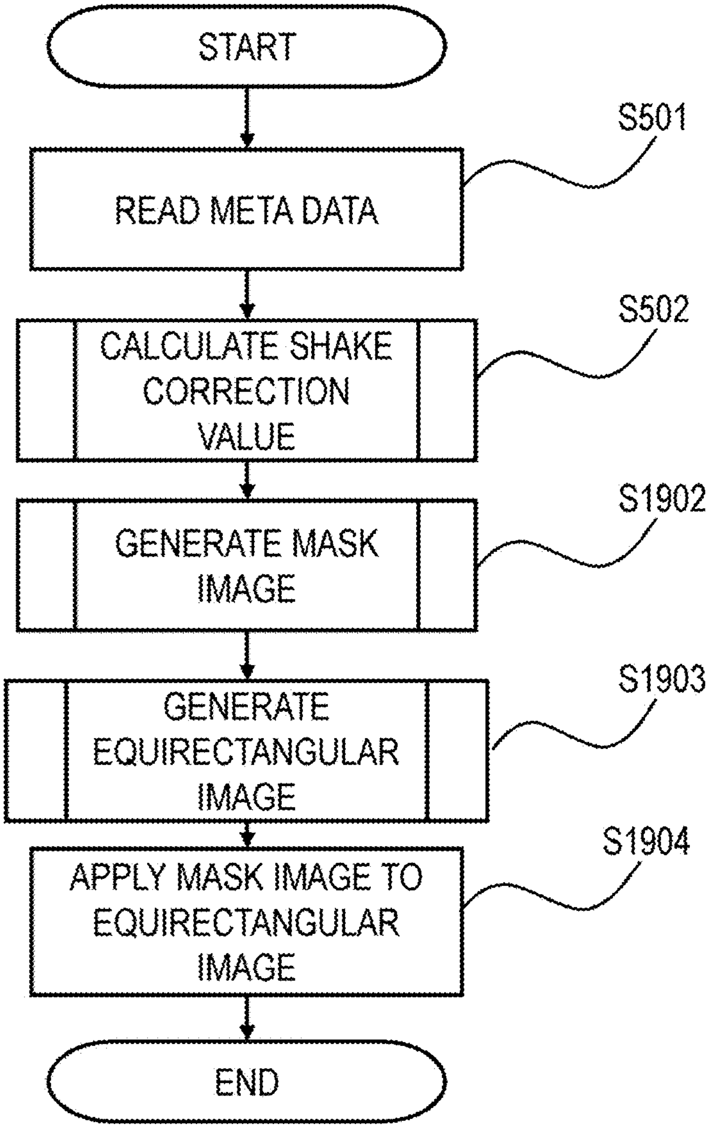
FIG. 19 is a flow chart of processing of generating equirectangular images according to the sixth embodiment.

FIG. 18 is a diagram illustrating a configuration of the control unit 101 in the sixth embodiment. The control unit 101 includes a correction information generation unit 109, a coordinate information generation unit 110, and a mask generation unit 111. Each of the components of the control unit 101 will be described with reference to a flow chart of FIG. 19. The flow chart of FIG. 19 is a diagram illustrating image generation according to the sixth embodiment.

In Step S501, the control unit 101 reads the common meta data stored in the file meta data region 302 of the video file through the input unit. The common meta data is meta data related to a shooting state of the video. For example, the common meta data includes the number of pixels in the video file, design values of an optical system, information on sizes of the image circles and positions thereof on a sensor, information related to a manufacturing error of the optical system, time-series information of an orientation of the optical system during video shooting, and information related to a sensor output.

In Step S502, the correction information generation unit 109 generates, e.g., the shake correction value for each of all the frames as the image correction information (geometrical image correction information) according to the flow chart of FIG. 6. Note that, by using the shake correction value when the equirectangular image is to be generated from the circular fisheye image (during the generation of the equirectangular image), it is possible to correct, for each of the frames, an effect of camera shake (shaking of the camera or camera wobbling) in the equirectangular image.

Note that, in the sixth embodiment, in Step S609 in the flow chart of FIG. 6, the correction information generation unit 109 (control unit 101) generates the shake correction value for a region of the circular fisheye image on the basis of meta data related to the shooting state of the video. To determine whether or not the image data in each of all the frames has been read in Step S602, it may also be possible to refer to the “information on the number of the frames included in the video” included in the meta data related to the shooting state of the video.

Figure 22:
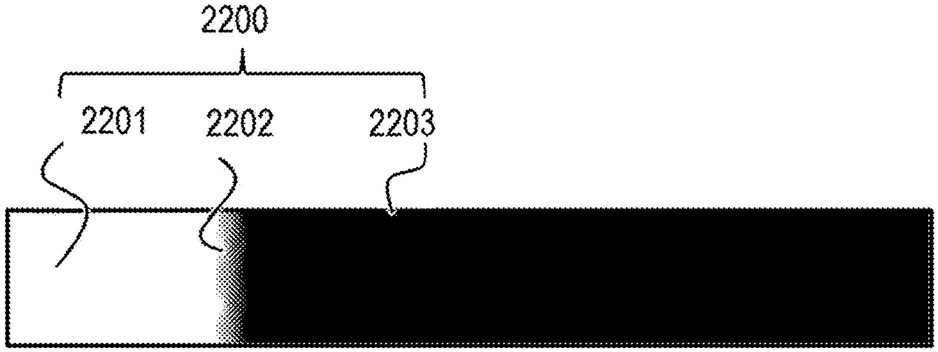
FIG. 22 is a diagram illustrating a gradation region according to the sixth embodiment.

In Step S1902, the mask generation unit 111 generates the mask image (such as a mask image 2200 as illustrated in FIG. 22) on the basis of the shake correction value serving as the image correction information. The mask image includes at least a “masked region covering the equirectangular image” and an “unmasked region that transmits and displays the equirectangular image without covering the equirectangular image”. Processing of generating the mask image will be described later by using a flow chart of FIG. 20.

In Step S1903, the coordinate information generation unit 110 obtains, for each of the frames, a coordinate value of a region of the circular fisheye image corresponding to the equirectangular image to generate the equirectangular image.

Figure 21:
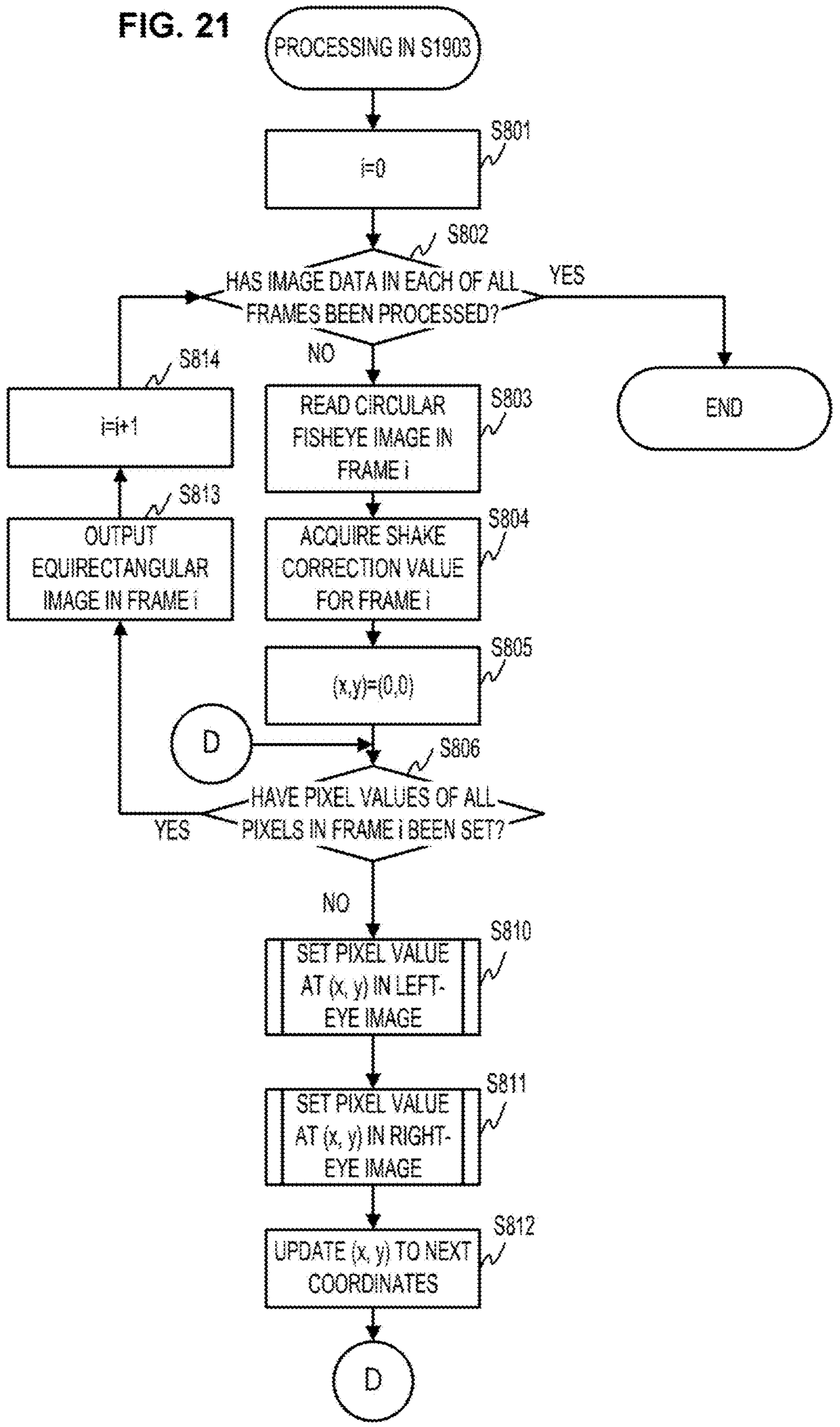
FIG. 21 is a flow chart of processing of generating the equirectangular images according to the sixth embodiment.

FIG. 21 illustrates a flow chart illustrating processing of generating the equirectangular image from the circular fisheye image. The flow chart of FIG. 21 is a flow chart obtained by removing Steps S807 to S809 from the flow chart of FIG. 8. Specifically, when it is determined in Step S806 that a pixel value of at least any of the pixels in the equirectangular image in the frame i has not been set, the flow advances to Step S810 without performing processing in Step S807. In other words, in the sixth embodiment, the invalid coordinate table is not used, and calculation of the invalid region in the equirectangular image is not performed.

In Step S1904, the coordinate information generation unit 110 applies (superimposes or combines) the mask image generated in Step S1902 to (on or with) the equirectangular image generated in Step S1903 to generate a new equirectangular image.

For example, the coordinate information generation unit 110 superimposes the mask image on the equirectangular image. At this time, the coordinate information generation unit 110 ensures that a region of the equirectangular image overlapping the masked region is hidden by the masked region and that a region of the equirectangular image overlapping the unmasked region is not hidden thereby. For example, the coordinate information generation unit 110 uses a darker pixel (with a lower brightness value) for each of the pixels in the equirectangular image which is at the same coordinates as those in the mask image to generate the new equirectangular image (equirectangular image having the mask image). Thus, the coordinate information generation unit 110 may also generate the new equirectangular image.

The sixth embodiment uses the meta data to allow a result of the camera shake correction processing to be considered for the mask image. As a result, even when a region (region outside of the image circle) unintended by a photographer is formed in the equirectangular image, it is possible to hide the region with the mask image. Consequently, a sense of immersion of the user in the VR video is improved.

Processing of Generating Mask Image in S1902

Figure 20:
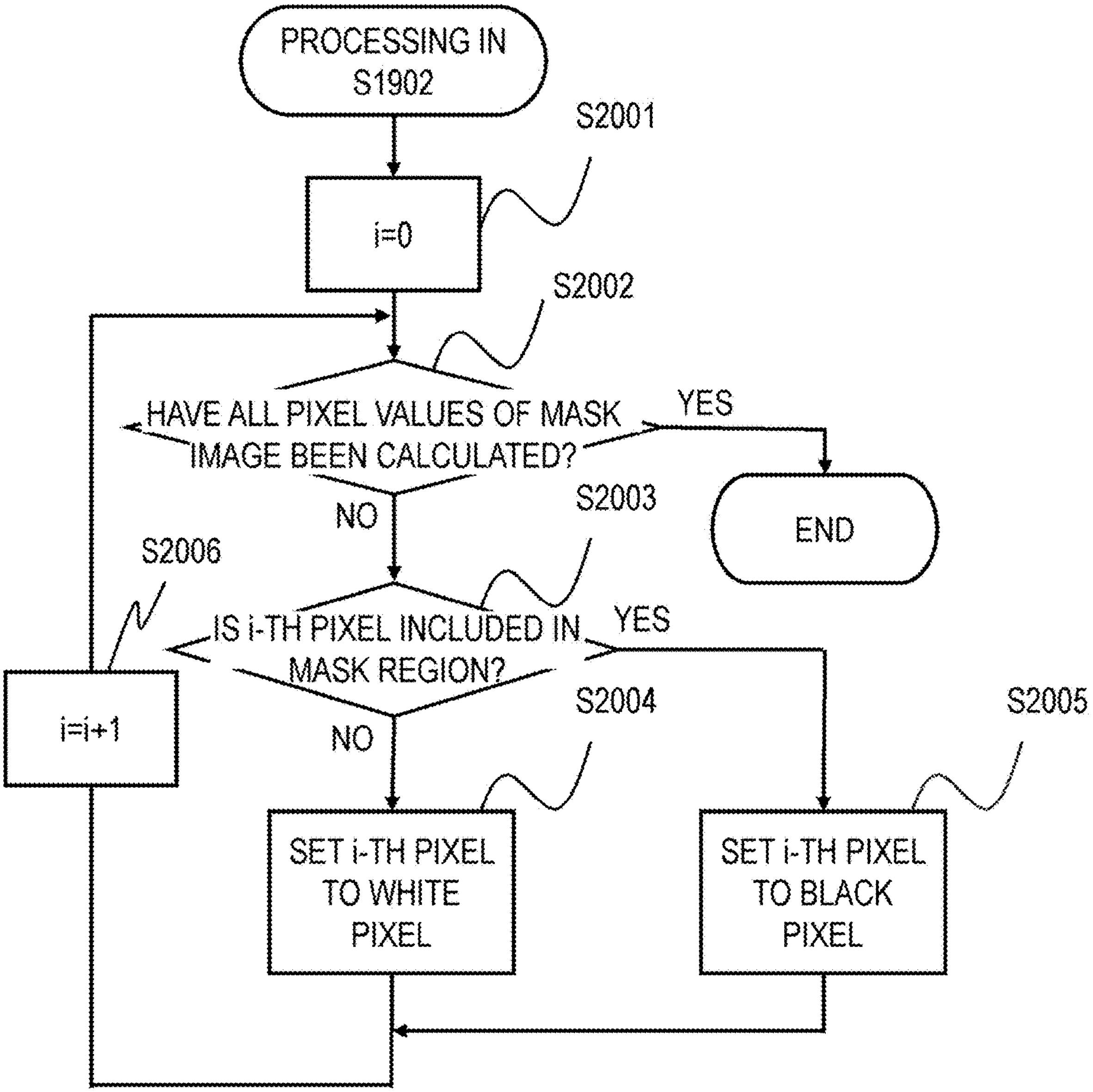
FIG. 20 is a flow chart of processing of generating a mask image according to the sixth embodiment.

Referring to a flow chart of FIG. 20, a description will be given of processing of generating the mask image in Step S1902.

In Step S2001, the mask generation unit 111 sets the variable i representing the position of the pixel to 0. Hereinbelow, an i-th pixel is one pixel in the mask image. Processing including and subsequent to Step S2001 may be processed sequentially in the X-direction of the (X, Y) coordinates, or may also be processed sequentially in the Y-direction.

In Step S2002, the mask generation unit 111 determines whether or not the pixel values of all the pixels in the mask image have been calculated. When it is determined that the pixel value of any of all the pixels in the mask image has not been calculated, a flow advances to Step S2003. When it is determined that the pixel values of all the pixels in the mask image have been calculated, processing in the present flow chart is ended.

In Step S2003, the mask generation unit 111 determines whether or not the i-th pixel in the mask image is included in the masked region. In the sixth embodiment, for determination of whether or not a given pixel is included in the masked region, the meta data related to the image circle 1021 and the shake correction value (geometrical image correction information) calculated in Step S502 are used.

For example, the coordinate information generation unit 110 calculates coordinates in the circular fisheye image (see FIGS. 4A to 4C), which correspond to coordinates in the equirectangular image. Then, the mask generation unit 111 refers to the meta data related to the image circle 1021 in the region of the circular fisheye image to be able to determine whether or not the given pixel in the equirectangular image corresponds to a pixel included in the image circle 1021. Therefore, the mask generation unit 111 determines the region (region of the mask image) at the same coordinates as those of the "region of the equirectangular image that does not correspond to the pixels in the image circle 1021" to be the masked region when the geometrical image correction, such as the camera shake correction, has not been performed.

Then, the mask generation unit 111 corrects (adjusts), on the basis of the shake correction value (geometrical image correction information) calculated in Step S502, the masked region (position and size of the masked region). For example, the mask generation unit 111 refers to the shake correction value for each of the frames to accordingly widen the masked region when the camera shake correction or the like has not been performed by the shake correction value. Thus, the mask generation unit 111 calculates the masked region (position and size of the masked region) to which the camera shake correction has been added.

Referring to the masked region thus calculated, in Step S2003, the mask generation unit 111 determines whether or not the i-th pixel is included in the masked region. When it is determined that the i-th pixel is included in the masked region, the flow advances to Step S2005. When it is determined that the i-th pixel is not included in the masked region, the flow advances to Step S2004.

In Step S2004, the mask generation unit 111 sets the i-th pixel in the mask image to a white pixel (sets a pixel value indicating white as the pixel value of the i-th pixel). When being superimposed on the given region of the equirectangular image, a region of the mask image that has been set to the white pixel transmits and displays the given region (the given region is displayed without being interrupted).

In Step S2005, the mask generation unit 111 sets the i-th pixel in the mask image as a black-color pixel (sets a pixel value indicating black as the pixel value of the i-the pixel). When being superimposed on the given region of the equirectangular image, a region of the mask image that has been set to the black-color pixel gives a black color to the given region to cover the given region.

In Step S2006, the mask generation unit 111 adds 1 to the variable i. As a result, the processing in Steps S2002 to S2005 is performed on the next pixel in the mask image.

Figure 23A:
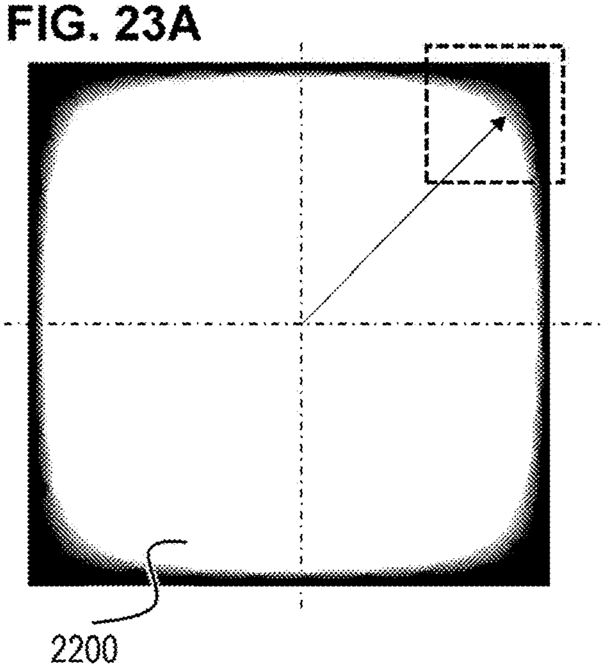
FIGS. 23A and 23B are diagrams illustrating the gradation region according to the sixth embodiment.

Thus, in the sixth embodiment, the pixel in the masked region is set as the black-color pixel, while a pixel in the unmasked region is set as a white-color pixel. By performing such processing, the mask generation unit 111 generates the mask image 2200, which is a distribution of white pixels and black pixels as illustrated in FIGS. 22 and 23A. Note that, as long as the masked region and the unmasked region can be distinguished from each other, the mask image 2200 is not limited to the distribution of the white pixels and the black pixels.

The mask image 2200 illustrated in FIGS. 22 and 23A may also be generated individually for each of the frames by using the shake correction value (correction value for correcting the camera shake) in the corresponding equirectangular image 402. The mask image 2200 may also be generated on the basis of a maximum correction value in all the frames. In this case, the mask image 2200 may also be applied to each of all the frames in the equirectangular image. In this case, for example, a mask image that reflects no invalid region is generated in each of all the frames of the equirectangular image. In addition, the mask image 2200 applied to each of all the frames of the equirectangular image is the same. Even when the shake correction value in the image in each of the frames has changed, a shape of a masked peripheral portion does not change. Therefore, it is possible to inhibit flickering in the VR video and simultaneously to improve the sense of immersion of the user in the VR video. Note that it may also be possible to generate a mask image that masks a predetermined region so as to be able to prevent the invalid region from being reflected even when shake correction is performed without being based on the shake correction value.

FIG. 22 illustrates an example in which the mask image 2200 is provided with a gradation region. FIG. 22 is a diagram obtained by extracting an end portion of the mask image 2200. The mask image 2200 has an unmasked region 2201. The mask image 2200 includes, as masked regions, a gradation region 2202 and a masked region 2203. The unmasked region 2201 is a white-pixel region. The masked region 2203 is a black-pixel region. The gradation region 2202 has an intermediate brightness value between those of the unmasked region 2201 and the masked region 2203. In the sixth embodiment, the brightness value of the gradation region 2202 can be obtained through linear interpolation of the brightness value of the unmasked region 2201 and the brightness value of the masked region 2203. Accordingly, in the gradation region 2202, the brightness value stepwise (continuously) varies from the unmasked region 2201 to the masked region 2203.

For example, when the gradation region 2202 is superimposed on a given region of the equirectangular image, a color of the gradation region 2202 is given to the given region. Alternatively, when the gradation region 2202 is superimposed on the given region of the equirectangular image, the gradation region 2202 may also transmit the given region with a higher transmittance as the brightness value thereof is higher and display the given region. By applying the mask image having the gradation region 2202, it is possible to smoothen a brightness variation in a peripheral portion of the VR video. Therefore, it is possible to improve the sense of immersion in the VR video.

The gradation region 2202 smoothens the brightness variation at a boundary portion between the unmasked region 2201 and the masked region 2203. In the sixth embodiment, a beginning portion of the gradation region 2202 (corresponding to the boundary position between the gradation region 2202 and the unmasked region 2201) is determined on the basis of the shake correction value. The mask image having the gradation region 2202 may also be generated for each of the frames on the basis of the shake correction value for each of the frames. The beginning position of the gradation region 2202 may also be determined on the basis of a maximum value among the shake correction values for all the frames.

Figure 23B:
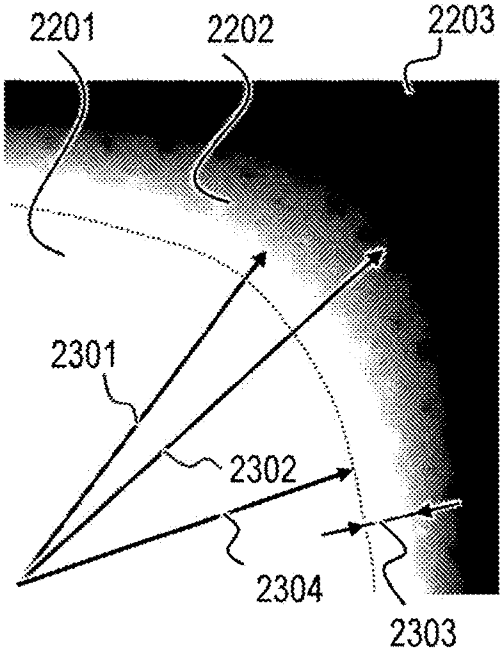

Referring to FIGS. 23A and 23B, a description will be given of a beginning position between the gradation region 2202 and the masked region 2203.

FIG. 23A is a diagram obtained by extracting pixels in the mask image 2200 that correspond to one circular fisheye region. FIG. 23B is a diagram obtained by partially enlarging the mask image 2200 in FIG. 23A. The mask image 2200 includes the unmasked region 2201, the gradation region 2202, and the masked region 2203. A gradation beginning position 2301 indicates a beginning position of the gradation region 2202 when correction based on camera shake correction is not performed. In FIG. 23B, the gradation beginning position 2301 is a position where the gradation region 2202 begins, which is closer to a center of the mask image 2200. The beginning position 2302 is a position where the masked region 2203 begins, which is closer to the center of the mask image 2200. A gradation beginning position 2304 is a position where the gradation region 2202 begins when correction based on the camera shake correction is performed.

A beginning position variation amount 2303, which is a difference between the gradation beginning position 2301 and the gradation beginning position 2304, corresponds to an amount of displacement of a relative position between the image circle 4011 and the region 4012, which has resulted from the camera shake correction. In other words, the gradation beginning position 2304 is shifted from the gradation beginning position 2301 in a center direction (direction in which the unmasked region 2201 is present) of the mask image 2200 by the number of pixels corresponding to the shake correction value. By thus adding information on the shake correction value with regard to the beginning position of the gradation region 2202, it is possible to smoothen the brightness variation in the peripheral portion. As a result, it is possible to more naturally hide reflection unintended by the photographer or the like with the mask image. Note that the gradation region is determined on the basis of, e.g., the white pixels and the black pixels which are set by the processing of generating the mask image (flow chart of FIG. 20) in Step S1902. Only a region of pixels corresponding to a predetermined width, which is included in a region of the black pixels, may also be determined to be the gradation region. Alternatively, only a region of pixels corresponding to a predetermined width, which is included in a region of the white pixels, may also be determined to be the gradation region. Still alternatively, a region of pixels corresponding to the predetermined width, which includes both the white pixels and the black pixels, may also be determined to be the gradation region.

Figure 24:
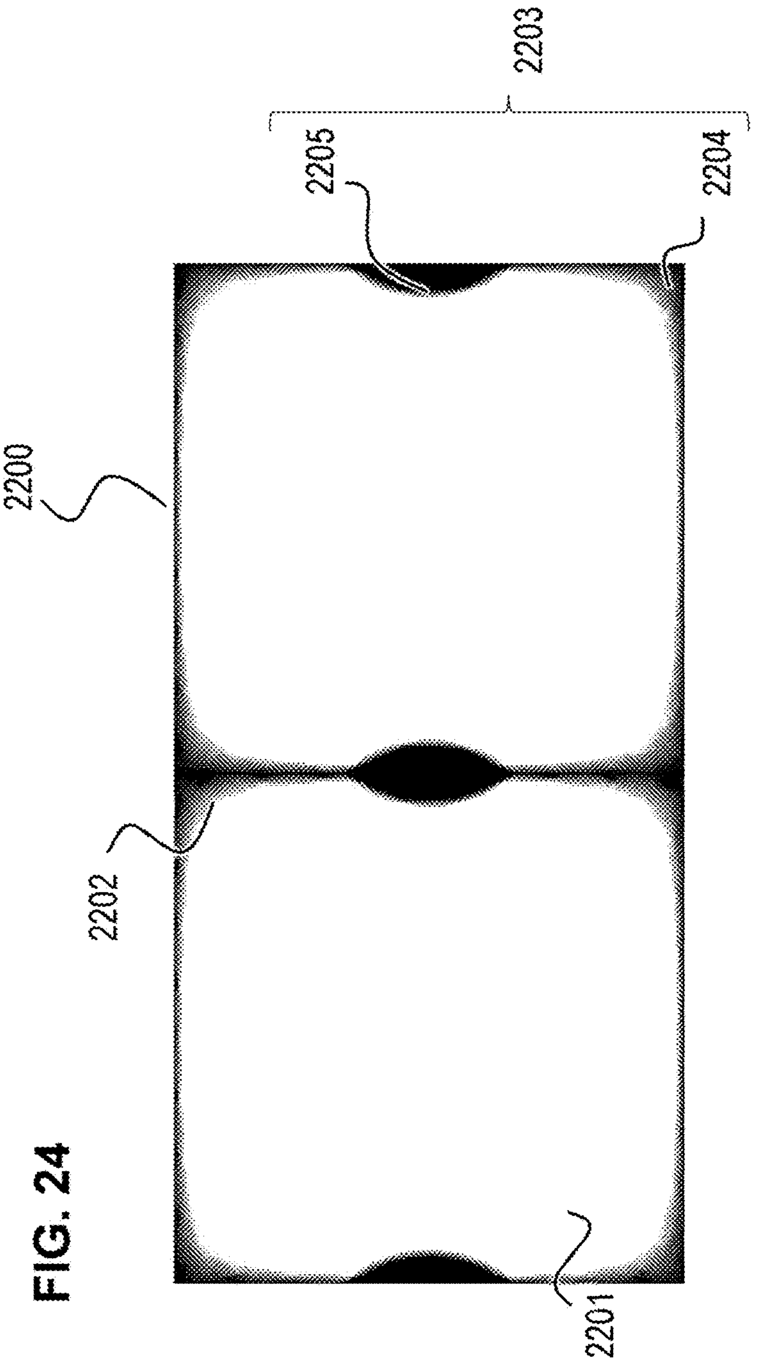
FIG. 24 is a diagram illustrating a configuration of the mask image according to the sixth embodiment.

FIG. 24 illustrates an example of the mask image 2200. The mask image 2200 corresponds to the circular fisheye image 403 (see FIG. 4B) having the two image circles. The unmasked region 2201 is the white-pixel region. The masked region 2203 is the black-pixel region. Between the unmasked region 2201 and the masked region 2203, the gradation region 2202 is set. The mask image 2200 includes the two unmasked regions 2201 corresponding to region of the circular fisheye images. The masked region 2203 is disposed so as to surround peripheral portions of the unmasked regions 2201.

In the mask image 2200 illustrated in FIG. 24, there are the two unmasked regions 2201 separated by the masked region 2203. The two unmasked regions 2201 correspond to the two image circles 1021 (regions of the two circular fisheye images) in the circular fisheye image 403. As illustrated in FIG. 24, the mask image 2200 has a first masked region 2204 and a second masked region 2205. The first masked region 2204 includes a range corresponding to the invalid region outside of the image circle.

In a case when, e.g., a fisheye lens having an angle of view over one hundred eighty degrees is used when the video including the two image circles is to be shot, as described with reference to FIGS. 10A and 10B, in a video shot by one optical system, another optical system may be reflected. The reflection unintended by a photographer may incur a sense of immersion of a viewer when viewing the VR video. Accordingly, in the sixth embodiment, the mask image 2200 has the second masked region 2205. The second masked region 2205 includes a range corresponding to the image 1023 and the image 1024, which is a region where the optical system is reflected.

Note that, when viewing the VR video, the user uses an HMD to view the video shot by the two optical systems with each of left and right eyes. At this time, when the masked region has different shapes on left and right sides, a region that can be viewed only with one of the eyes is formed, and the video may cause an uncomfortable feeling. In the sixth embodiment, to allow the masked region to have equal shapes on the left and right sides, the second masked region 2205 is configured to have symmetrical shapes in left and right videos.

Thus, in the sixth embodiment, an example using the shake correction value as the image correction information to be used to generate the mask image is shown. It is to be noted herein that, in the VR video, to allow an appropriate stereoscopic effect to be felt, it is important that a parallax between a left-eye image and a right-eye image is appropriately set. Consequently, parallax correction for adjusting positions of left and right images may be performed. In addition, when there is an unintended inclination in the VR video, the sense of immersion of the viewer may be impaired. To prevent this, horizontal correction for adjusting the inclination of the video may be performed. Therefore, the geometrical correction to be performed on the equirectangular image is not limited to the camera shake correction, and may also be either of horizontal correction and parallax correction. In addition, the image correction information may also be either of the horizontal correction and the parallax correction.

Meanwhile, with regard to the camera shake correction, the image correction information may also be calculated by using a sensor output (sensor information) from an acceleration sensor mounted in the image capturing apparatus, or the like, as the meta data. Alternatively, information on detected feature points in each of the frames may also be used as the meta data. Still alternatively, the meta data may also be information, which is combined information of the sensor output and the feature points. With regard to the horizontal correction, e.g., an output of a sensor included in the image capturing apparatus, such as a gyro sensor, may also be used as the meta data. With regard to the parallax correction, information related to a deviation of a real value of the optical system from a design value may also be used as the meta data. Yet alternatively, information related to relative positions of the two image circles calculated from the image may also be used as the meta data. Note that, in the sixth embodiment, the mask image is generated so as to be applied to the equirectangular image, but is not limited thereto. For example, it may also be possible to generate the mask image so as to apply the mask image to the circular fisheye image, apply the mask image to the circular fisheye image, and then obtain the equirectangular image.

Seventh Embodiment

Figure 25:
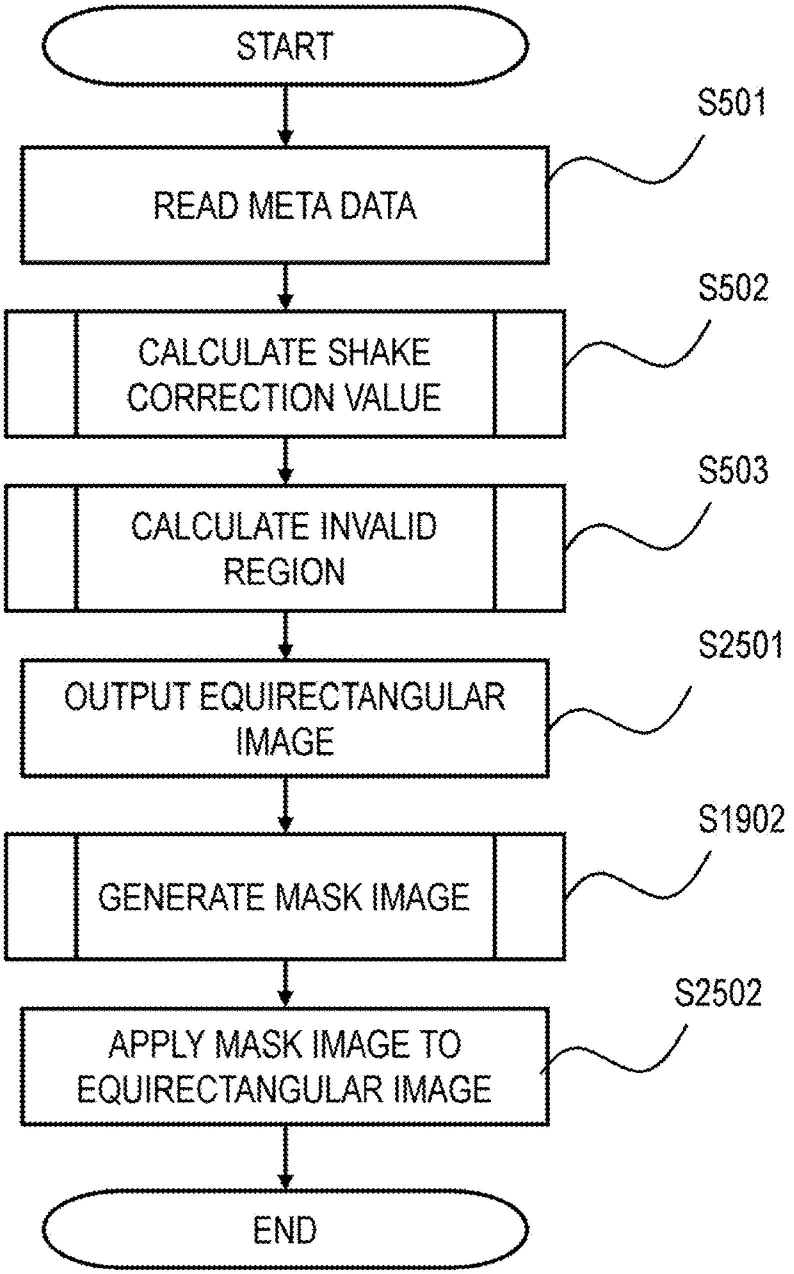
FIG. 25 is a flow chart of processing of generating equirectangular images according to a seventh embodiment.

In a seventh embodiment, referring to FIG. 25, a description will be given of processing when an error region (region to which pixel values corresponding to the invalid region are to be set, though the pixel values correspond to the valid region) is formed when the equirectangular image is obtained from the circular fisheye image. A flow chart of FIG. 25 illustrates processing in the seventh embodiment. Note that a step in which the same processing as performed in each of the steps of the flow chart of FIG. 5 or the flow chart of FIG. 19 is performed is designated by the same number, and a description thereof is omitted.

In Step S2501, the control unit 101 generates the equirectangular image in each of all the frames, and outputs the generated equirectangular image.

In Step S2502, to the equirectangular image generated in Step S504, the mask image generated in Step S1902 is applied to generate a new equirectangular image.

It is to be noted herein that, in Step S2501 described above, the processing in the flow chart of FIG. 9 is performed in the same manner as in Step S504.

Figure 9:
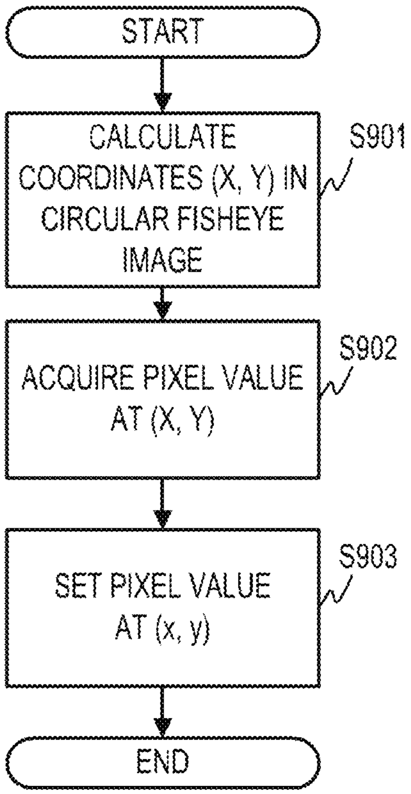
FIG. 9 is a flow chart of processing of setting pixel values according to the first embodiment.

In Step S902 in the flow chart of FIG. 9, the control unit 101 acquires a pixel value at each of the coordinates (X, Y) in the region of the circular fisheye image. At this time, the control unit 101 determines, e.g., coordinates in the circular fisheye image that correspond to each of the pixels in the equirectangular image, and acquires a pixel value of the pixel. It is to be noted herein that, to reduce arithmetic processing in the control unit 101, when pixels in the circular fisheye video corresponding to pixels in the equirectangular image are to be calculated, interpolation processing may be performed.

Figure 26:
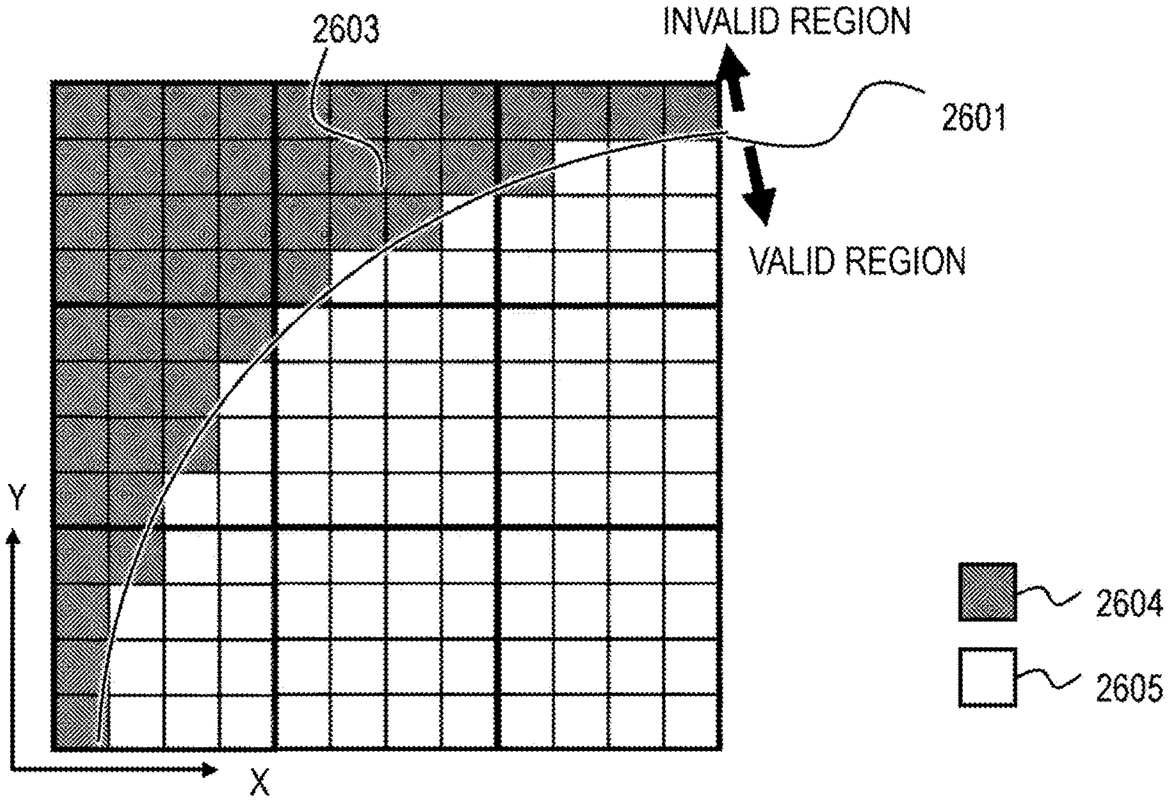
FIG. 26 is a diagram illustrating an error region according to the seventh embodiment.
Figure 27:
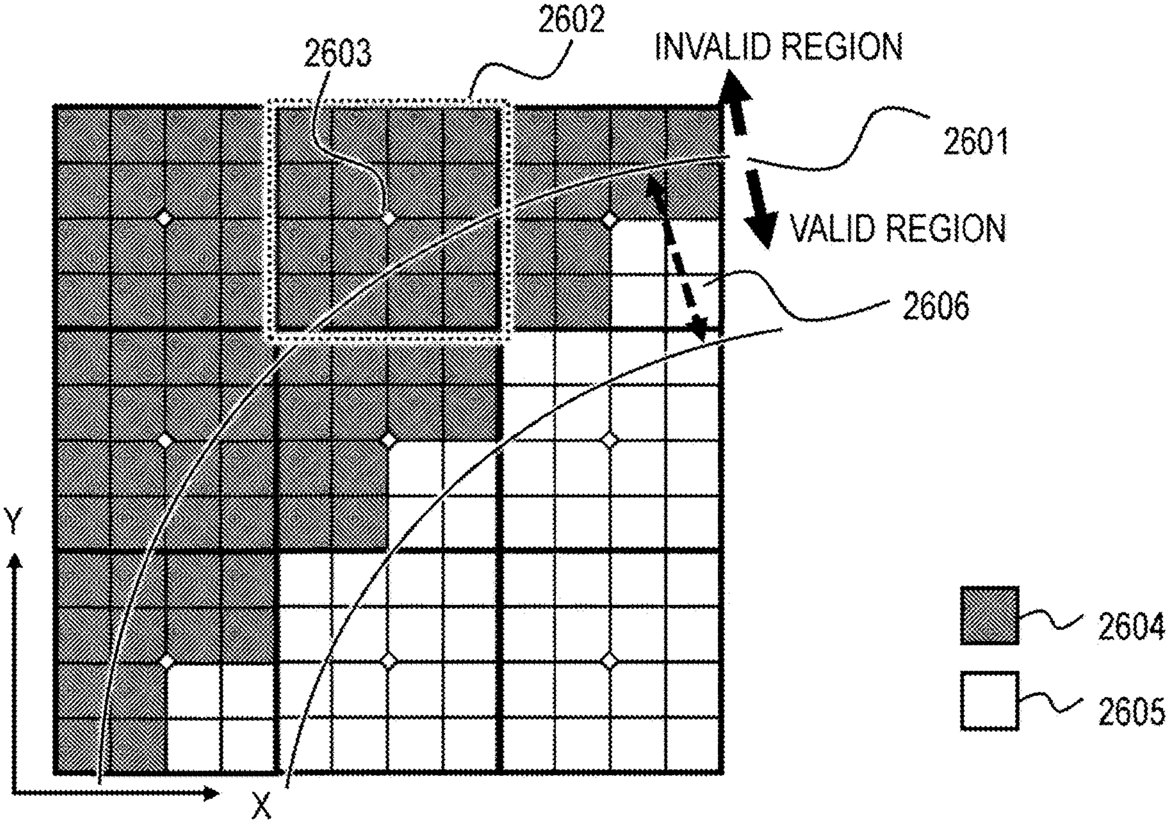
FIG. 27 is a diagram illustrating the error region according to the seventh embodiment.

Referring to FIGS. 26 and 27, a description will be given of an error region (region to which pixel values corresponding to the invalid region are to be set, though the pixel values correspond to the valid region) resulting from the interpolation processing. FIG. 26 is a diagram obtained by partially enlarging the equirectangular image 406 when the interpolation processing is not performed. Each one of the rectangular regions in FIG. 26 represents one pixel in the equirectangular image 406.

The coordinate information generation unit 110 calculates, for a given pixel in the equirectangular image 406, the corresponding "coordinates of the pixel in the region of the circular fisheye image". An invalid region boundary line 2601 is a line obtained by projecting a line indicating the boundary between the valid region and the invalid region in the region of the circular fisheye image on the region of the equirectangular image. In other words, in FIG. 26, to the pixels located inside of the invalid region boundary line 2601 (in the lower right), pixel values of the corresponding image in the region (valid region) of the circular fisheye image are input, and handled as valid pixels 2605. Meanwhile, it is determined that the pixels outside of the invalid region boundary line 2601 (in the upper left) include no corresponding pixel (correspond to the invalid region), and black pixels 2604 are input thereto.

FIG. 27 is a diagram partially illustrating the same equirectangular region as illustrated in FIG. 26, but partially illustrates the equirectangular image when the interpolation processing is performed. In a case when the interpolation processing is performed, pixels in the region of the circular fisheye image, which individually correspond to the respective pixels, are not obtained. In this case, a given block (interpolation block 2602) is assumed to be one unit, and the "coordinates in the region of the circular fisheye image" corresponding to a center 2603 of the interpolation block 2602 are obtained. In the seventh embodiment, the interpolation block 2602 is a square of four pixels by four pixels. At this time, as a method of obtaining the "coordinates in the region of the circular fisheye image" corresponding to each of the pixels, a method using linear interpolation can be considered. An "X-coordinate in the region of the circular fisheye image" corresponding to each of the pixels can be calculated by the linear interpolation using coordinates of the two centers 2603 adjacent to each other in the X-direction. A "Y-coordinate in the region of the circular fisheye image" corresponding to each of the pixels can be calculated by the linear interpolation using the coordinates of the centers 2603 of the two interpolation blocks adjacent to each other in the Y-direction. It is assumed herein that the interpolation block is the square of four pixels by four pixels, but the interpolation block is not limited thereto. It may also be possible to assume that the interpolation block is a square of three pixels by three pixels, and "coordinates in the region of the circular fisheye image" corresponding to the pixel at the center of the interpolation block may also be used. Note that a shape of the interpolation block is not limited to a square, and may also be a rectangle including a plurality of pixels.

When it is determined that the center 2603 corresponds to the invalid region of the circular fisheye image, coordinates corresponding to the center 2603 cannot be obtained. Meanwhile, "coordinates in the region of the circular fisheye image" corresponding to each of the pixels are obtained by linear interpolation using the coordinates of the two adjacent centers 2603. Accordingly, to pixels located between the "center 2603 determined to correspond to the invalid region" and the "center 2603 adjacent thereto", the black pixels 2604 serving as the invalid pixels are input.

In FIG. 27, compared to FIG. 26, the number of the pixels to which the black pixels 2604 are to be input as a result of performing the interpolation processing has increased. In addition, in FIG. 27, a boundary portion between the black pixels 2604 and the valid pixels 2605 has a rugged shape, which inhibits the sense of immersion of the viewer when viewing the VR video. Accordingly, in the seventh embodiment, the masked region 2203 is generated so as to be able to cover an "error region 2606 which is a region to which the invalid pixel values are input, though the error region 2606 corresponds to the valid pixels". More specifically, the mask generation unit 111 preliminarily calculates the error region 2606 resulting from the interpolation processing, and generates the masked region 2203, which is accordingly wider by a width of the error region 2606 when generating the mask image 2200.

As a result, in the seventh embodiment, it is possible to hide the region of the equirectangular image resulting from an arithmetic error with the mask image, and, therefore, to prevent the sense of immersion of the viewer when viewing the VR video from being impaired.

Note that the seventh embodiment has shown an example in which, after the equirectangular image is generated from a result of calculating the invalid region, the mask image is generated. In an order of generation, the mask image may be generated earlier, or the generation of the equirectangular image and the generation of the mask image may also be simultaneously processed in parallel.

According to the present invention, it is possible to generate a VR video with reduced flickering during reproduction.

In the foregoing, "when A is equal to or more than B, advance to Step S1 and, when A is smaller (lower) than B, advance to Step S2" may also be read as "when A is larger (higher) than B, advance to Step S1 and, when A is equal to or less than B, advance to Step S2". Conversely, "when A is larger (higher) than B, advance to Step S1 and, when A is equal to or less than B, advance to Step S2" may also be read as "when A is equal to or more than B, advance to Step S1 and, when A is smaller (lower) than B, advance to Step S2". Accordingly, as long as no contradiction arises, "equal to or more than A" may also be read as "larger (higher, longer, or more) than A", while "equal to or less than A" may also be read as "smaller (lower, shorter, or less) than A". In addition, "larger (higher, longer, or more) than A" may also be read as "equal to or more than A", while "smaller (lower, shorter, or less) than A" may also be read as "equal to or less than A".

Note that each of the various controls described above may be or may not be performed by one hardware item (e.g., a processor or a circuit). It may also be possible that a plurality of hardware items (e.g., a plurality of processors, a plurality of circuits, or a combination of one or more processors and one or more circuits) share processing and thereby control the entire apparatus.

The processor mentioned above is a processor in a broad sense of meaning, and includes a versatile processor and a dedicated processor. Examples of the versatile processor include a CPU (Central Processing Unit), an MPU (Micro Processing Unit), a DSP (Digital Signal Processor), and the like. Examples of the dedicated processor include a GPU (Graphics Processing Unit), an ASIC (Application Specific Integrated Circuit), a PLD (Programmable Logic Device), and the like. Examples of the programmable logic device include a FPGA (Field Programmable Gate Array), a CPLD (Complex Programmable Logic Device), and the like.

While the embodiments of the present invention have been described in detail, the present invention is not limited to these specific embodiments, and encompasses various modes in a scope not departing from the gist of the invention. In addition, each of the embodiments described above merely represents an embodiment of the present invention, and the individual embodiments may also be combined with each other as appropriate.

OTHER EMBODIMENTS

Embodiment(s) of the present disclosure can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electronic device that converts a first video in a first display mode including a shooting region representing a result of shooting by an image capturing apparatus to a second video, which is a video in a second display mode including a plurality of frames, the electronic device comprising one or more processors and/or circuitry configured:

to perform acquisition processing of acquiring the first video and meta data related to a shooting state of the first video;

to perform information generation processing of generating, on a basis of the meta data, correction information related to geometrical correction to be performed during generation of the second video;

to perform mask generation processing of generating a mask image covering a local region of the second video; and to perform generation processing of generating the second video, to which the mask image is applied to each of the frames, through conversion of the first video on a basis of the correction information.

2. The electronic device according to claim 1, wherein the correction information is a maximum value of correction values for the correction performed on all the frames of the first video, and wherein the generation processing includes applying the same mask image to each of all the frames of the second video.

3. The electronic device according to claim 1, wherein the mask image has a first region covering the second video by giving a specific color to the second video and a second region to be displayed without overing the second video.

4. The electronic device according to claim 3, wherein the mask image has, between the first region and the second region, a third region where a brightness of the color given to the second video continuously varies from the first region to the second region.

5. The electronic device according to claim 4, wherein a position of a boundary between the third region and the second region is based on the correction information.

6. The electronic device according to claim 1, wherein, in case when the second video has a specific region that does not have a pixel value according to the shooting region even though the specific region is a region corresponding to the shooting region, the mask image includes a region covering the specific region.

7. The electronic device according to claim 1, wherein the first video has regions of at least two circular fisheye images, wherein the second video has respective equirectangular projection images corresponding to the at least two circular fisheye images, and wherein the mask image has a region covering a peripheral portion of each of the equirectangular projection images.

8. The electronic device according to claim 1, wherein the first video has a region reflecting an optical system that acquires the shooting region, and wherein the mask image has a region in the second video which covers a region corresponding to the region reflecting the optical system.

9. The electronic device according to claim 1, wherein the meta data includes at least any of information related to a design value of an optical system that acquires the shooting region, information related to a deviation of a real value of the optical system from the design value, time-series information related to an orientation of the optical system, and information related to relative positions of at least two image circles in case when the shooting region has the at least two image circles.

10. The electronic device according to claim 1, wherein the generation processing includes generating, on a basis of the correction information, the second video by acquiring a pixel value of a coordinate in the first video corresponding to each coordinate in the second video.

11. The electronic device according to claim 1, wherein the mask generation processing includes generating, on a basis of the correction information, the mask image covering a local region of the second video.

12. The electronic device according to claim 1, wherein the generation processing includes applying, after the second video is generated by converting the first video on a basis of the correction information, the mask image to each of the frames of the second video to cover a local region of the second video.

13. A control method of an electronic device that converts a first video in a first display mode including a shooting region representing a result of shooting by an image capturing apparatus to a second video, which is a video in a second display mode including a plurality of frames, the control method comprising:

an acquisition step of acquiring the first video and meta data related to a shooting state of the first video;

an information generation step of generating, on a basis of the meta data, correction information related to geometrical correction to be performed during generation of the second video;

a mask generation step of generating a mask image covering a local region of the second video; and a generation step of generating the second video, to which the mask image is applied to each of the frames, through conversion of the first video on a basis of the correction information.

14. A non-transitory computer readable medium that stores a program, wherein the program causes a computer to execute a control method of an electronic device that converts a first video in a first display mode including a shooting region representing a result of shooting by an image capturing apparatus to a second video, which is a video in a second display mode including a plurality of frames, the control method comprising:

an acquisition step of acquiring the first video and meta data related to a shooting state of the first video;

an information generation step of generating, on a basis of the meta data, correction information related to geometrical correction to be performed during generation of the second video;

a mask generation step of generating a mask image covering a local region of the second video; and a generation step of generating the second video, to which the mask image is applied to each of the frames, through conversion of the first video on a basis of the correction information.

* * * * *